US010373268B1

(12) United States Patent
Orphys et al.

(10) Patent No.: US 10,373,268 B1
(45) Date of Patent: Aug. 6, 2019

(54) DETERMINING CORRECT ANSWERS TO TAX AND ACCOUNTING ISSUES ARISING FROM BUSINESS TRANSACTIONS AND GENERATING ACCOUNTING ENTRIES TO RECORD THOSE TRANSACTIONS USING A COMPUTERIZED PREDICATE LOGIC IMPLEMENTATION

(71) Applicants: Henry A. Orphys, Greenwich, CT (US); William Jaworski, Maplewood, NJ (US); Elena Filatova, New York, NY (US)

(72) Inventors: Henry A. Orphys, Greenwich, CT (US); William Jaworski, Maplewood, NJ (US); Elena Filatova, New York, NY (US)

(73) Assignee: Henry A. Orphys, Greenwich, CT (US)

( * ) Notice: Subject to any disclaimer, the term of this patent is extended or adjusted under 35 U.S.C. 154(b) by 613 days.

(21) Appl. No.: 14/874,826

(22) Filed: Oct. 5, 2015

Related U.S. Application Data

(60) Provisional application No. 62/059,935, filed on Oct. 5, 2014.

(51) Int. Cl.
*G06F 17/22* (2006.01)
*G06Q 40/00* (2012.01)

(52) U.S. Cl.
CPC ................. *G06Q 40/123* (2013.12)

(58) Field of Classification Search
USPC ............. 705/4, 2, 39, 38, 37, 345; 709/202; 706/47; 707/602, 802, 102, 784; 715/736
See application file for complete search history.

(56) References Cited

U.S. PATENT DOCUMENTS

| 6,684,384 | B1 | 1/2004 | Bickerton et al. |
| 7,131,069 | B1 | 10/2006 | Rush et al. |
| 7,344,070 | B2 | 3/2008 | Nobutani |
| 7,529,701 | B2 | 5/2009 | Shields et al. |
| 7,580,880 | B2 | 8/2009 | Meyerhoff, II |
| 7,668,860 | B2 * | 2/2010 | Naibo ............... G06F 16/86 707/794 |
| 7,991,658 | B2 | 8/2011 | Bond et al. |
| 8,320,656 | B1 | 11/2012 | Bhatt |
| 2008/0228800 | A1 * | 9/2008 | Dettinger ........... G06F 16/2423 |
| 2009/0100004 | A1 * | 4/2009 | Andrei ............... G06F 16/2453 |

(Continued)

OTHER PUBLICATIONS

J. M. Almendros-Jimenez et al, Querying XML Documents in Logic Programming. Under consideration for publication in Theory and Practice of Logic Programming. Oct. 2006, pp. 1-39.

(Continued)

*Primary Examiner* — Tien C Nguyen
(74) *Attorney, Agent, or Firm* — Otterstedt, Wallace & Kammer, LLP

(57) ABSTRACT

At least one pertinent authority, in ordinary English language, is paraphrased into a series of intermediate forms. The at least one pertinent authority is at least one of a tax authority and an accounting authority. The series of intermediate forms are rendered into a corresponding series of logical statements. The series of logical statements are encoded into relations in a logic programming language.

12 Claims, 17 Drawing Sheets

(56) References Cited

U.S. PATENT DOCUMENTS

| | | | | |
|---|---|---|---|---|
| 2009/0132456 A1* | 5/2009 | Dettinger | ............... | G06N 5/025 706/47 |
| 2009/0138456 A1* | 5/2009 | Dettinger | ............ | G06F 16/2428 |
| 2011/0270870 A1* | 11/2011 | Dettinger | .............. | G06F 16/951 707/769 |
| 2017/0060831 A1 | 3/2017 | Smythe et al. | | |

OTHER PUBLICATIONS

Boolean algebra, downloaded from http://en.wikipedia.org/wiki/Boolean_algebra on Oct. 4, 2014, pp. 1-20.
ERulemaking at the Crossroads. A collection of white papers prepared for dg.o 2006. The 7th Annual International Conference on Digital Government Research San Diego, California. pp. 1-27.
Digital Government Society. Downloaded from https://dgsociety.org/ on Sep. 25, 2015. pp. 1-4.
E-Rulemaking: Information Technology and Regulatory Policy. Cary Coglianese Regulatory Policy Program. 2003. pp. 1-45.
Gloria T. Lau et al. Legal Information Retrieval and Application to E-Rulemaking. ICAIL '05, Jun. 6-11, 2005, Bologna, Italy. pp. 1-9.
Logic programming. Downloaded from https://en.wikipedia.org/wiki/Logic_programming on Sep. 26, 2015. pp. 1-12.
Natural language processing (NLP). Downloaded from http://en.wikipedia.org/wiki/Natural_language_processing on Oct. 4, 2014. pp. 1-10.
Natural language programming. Downloaded from https://en.wikipedia.org/wiki/Natural_language_programming on Oct. 3, 2015. pp. 1-4.
Natural language understanding. Downloaded from http://en.wikipedia.org/wiki/Natural_language_understanding on Oct. 4, 2014. pp. 1-5.
Parsing. Downloaded from https://en.wikipedia.org/wiki/Parsing#Computer_languages on Oct. 4, 2014. pp. 1-10.
Predicate logic. Downloaded from https://en.wikipedia.org/wiki/Predicate_logic on Oct. 2, 2015. pp. 1-2.
Computation in Predicate Logic. Downloaded from http://www.cs.rochester.edu/~nelson/courses/csc_173/predlogic/computation.html on Sep. 26, 2015. pp. 1-3.
Prolog. Downloaded from https://en.wikipedia.org/wiki/Prolog on Oct. 2, 2015. pp. 1-20.
Prolog syntax and semantics. Downloaded from https://en.wikipedia.org/wiki/Prolog_syntax_and_semantics on Oct. 3, 2015. pp. 1-7.
Shai Berger, Pythologic Prolog syntax in Python (Python recipe). Downloaded from http://code.activestate.com/recipes/303057pythologicprologsyntaxinpython/ on Oct. 1, 2015. pp. 1-8.
Python (programming language). Downloaded from https://en.wikipedia.org/wiki/Python_(programming_language) on Oct. 2, 2015. pp. 1-18.
Stuart Shulman et al. SGER Collaborative: A Testbed for eRulemaking Data. Project Highlight prepared for dg.o 2004. pp. 1-2 (2004).
String searching algorithms. Downloaded from http://en.wikipedia.org/wiki/String_searching_algorithm on Oct. 4, 2014. pp. 1-4.
Syllogism. Downloaded from http://en.wikipedia.org/wiki/Syllogism on Oct. 4, 2014. pp. 1-15.
XML. Downloaded from https://en.wikipedia.org/wiki/XML on Sep. 25, 2015. pp. 1-16.
XML database. Downloaded from https://en.wikipedia.org/wiki/XML_database on Oct. 2, 2015. pp. 1-4.
Merrie Bergmann et al. The Logic Book, Sixth Edition. McGraw-Hill 2014, pp. 262-397, 474-541, 544-611.
TurboTax—Wikipedia, the free encyclopedia, page was last modified on Aug. 5, 2013, pp. 1-3, retrieved Oct. 16, 2018 from https://web.archive.org/web/20131208232520/https://en.wikipedia.org/wiki/TurboTax.
Salton, G. The Smart Retrieval System—Experiments in Automatic Document Processing, Prentice Hall, Englewood Cliffs, NJ, 1971. xix, 556 p. 15, 317-322, 323-329.
Vector space model, From Wikipedia, the free encyclopedia, Retrieved from "https://en.wikipedia.org/w/index.php?title=Vector_space_model&oldid=668110552" pp. 1-5, Jun. 22, 2015.
Baeza-Yates, R., and Ribeiro-Neto, B., Modem Information Retrieval, ACM Press, New York, NY, 1999. pp. i-xvii, 19-34, 256-340.
Salton, G., and Buckley, C. Term-Weighting Approaches in Automatic Retrieval, Information Processing and Management, vol. 24, Issue 5 (1988), pp. 323-328.
Ben Yagoda (May 12, 2011), "The Rise of "Logical Punctuation"", Slate. Downloaded from http://www.slate.com/articles/life/the_good_word/2011/05/the_rise_of_logical_punctuation.single.html on Nov. 24, 2015, pp. 1-10.
The Chicago Manual of Style Online, 16th edition, Jan. 17, 2013, retrieved Oct. 16, 2018 from https://web.archive.org/web/20130117012359/https://www.chicagomanualofstyle.org/qanda/data/faq/topics/Punctuation/faq0012.html.
Corporate Tax Software—Home—Corptax, Nov. 12, 2012, downloaded Oct. 16, 2018 from https://web.archive.org/web/20121112234006/http://www.corptax.com:80/Pages/default . . . , pp. 1-2.
Daniels, Jody J., and Edwina L. Rissland. "Locating passages using a case-base of excerpts." Proceedings of the seventh international conference on Information and knowledge management. ACM, 1998. pp. 1-7.
Edwina L. Rissland, Artificial Intelligence and Legal Reasoning: A Discussion of the Field and Gardner's Book. http://www.researchgate.net/publication/220604588 pp. 1-12 Jan. 1988.
Daniels, Jody J., and Edwina L. Rissland. "Finding Legally Relevant Passages in Case Opinions"I CAIL-97, Melbourne, Australia 0 1997 ACM 0-89791-924—pp. 39-46.
Cambridge Press, Introduction to Information retrieval, Online Edition, 2009, pp. 1-18, 19-47, 109-133, 195-218.
Donald A. Metzler Jr., Beyond Bags of Words: Effectively Modeling Dependence and Features in Information Retrieval Submitted to the Graduate School of the University of Massachusetts Amherst in partial fulfillment of the requirements for the degree of Doctor of Philosophy pp. i-xix, 1-190 Sep. 2007 Computer Science.
Amit Singhal, Modem Information Retrieval: A Brief Overview, Copyright 2001 IEEE, pp. 1-9.
Quotation mark, From Wikipedia, the free encyclopedia, Sep. 5, 2015, pp. 1-13.
Official Python website, Copyright © 2001-2018. Python Software Foundation, pp. 1-3, downloaded Oct. 16, 2018 from https://www.python.org/.
PSICStus Prolog—Leading Prolog Technology | RISE SICS downloaded Oct. 16, 2018 from https://www.sics.se/projects/sicstus-prolog-leading-prolog-technology, pp. 1-6.

* cited by examiner

| September 10, 2015 | Director, Tax Compliance and Accounting performs the following actions:

- performs cursory review of Judgment and Internal Law Department Memo and concludes, based on his knowledge of the Internal Revenue Code, that the payments are probably deductible by XYZ. — 5

- Performs cursory review of the rules published by Financial Accounting Standards Board and concludes that, despite the fact that Company A will not deduct on its federal income tax return the payments made in years after 2015 until they are made, Company XYZ must record the full tax consequences of the judgment in its books and records for the month ending September 30, 2015. — 6 |

| September 11, 2015 | Director, Tax Compliance and Tax Accounting Gives Copy of Judgment, Chief Accounting Officer's memo, and Internal Law Department Memo To Manager, Tax Accounting of Company XYZ, tells him that Company XYZ will record a $1 million pre-tax expense and associated liability in its books for September 2015 as a result of the judgment, and instructs the Manager, Tax Accounting to record whatever tax effects of the Judgment are required to be recorded in XYZ's accounting records as a transaction affecting XYZ's September, 2015 operating results. The Director, Tax Compliance and Tax Accounting does not determine for the Tax Accounting Manager the proper entry to record or share the details of the analysis behind his decision to record the tax consequences of the Judgment in September. He just says "record this". — 7 |

Analysis by Tax Manager vs. by Exemplary System
See FIG. 2 — 8

Public accounting firm hired to "audit" Company XYZ's books reviews journal entries, explanations for journal entries, judgment, FASB rules and tax law and determines whether it agrees with Company XYZ's decision about how to record the Judgment in XYZ's financial statements. If the public accounting firm agrees with XYZ's method of recording this judgment in its financial statements, the public accounting firm can issue its opinion that XYZ's financial statements "present fairly" the results of XYZ's operations for this reporting period with respect to the Judgment. — 12

*FIG. 1B*

| Step | Prior Art | Exemplary System | Step |
|---|---|---|---|
| 201A | Issue #1: Are Payments Required by the Judgment Deductible? | Issue #1: Are Payments Required by the Judgment Deductible? | 201B |
| 202A | The Tax Manager reads the Judgment and notes that it includes the words ". . . amounts owed to John Q. Acme under the terms of his employment agreement . . . . The Court finds that John Q. Acme is entitled to recover from Company XYZ the sum of $1,000,000 as compensation for personal services provided by him to Company XYZ, of which $850,000 is payable within 10 days of the date of this order and of which $150,000 is payable when Company XYZ collects from its customers the $1,500,000 in fees for which John Q. Acme is entitled to be paid a 10% commission." | The Tax Manager opens on his computer the software program written to implement the exemplary system and selects from the drop-down menu the item named "Ask me a question." This opens a window with a drop-down menu that includes the following, which the Tax manager selects: <br>-deduction <br><br> - compensation <br><br> The Tax Manager also selects from a drop-down menu listing the types of taxes "federal" taxes. | 202B |
| 204A | Tax Manager uses his computer to look up in an online tax research application the word "compensation" in the index to the Internal Revenue Code, Title 26, U.S.C. (the "Code") and is referred to Section 162 of the Internal Revenue Code. He sees that under Code Section 162 a taxpayer is "allowed as a deduction all the ordinary and necessary expenses paid or incurred during the taxable year in carrying on any trade or business, including – (1) a reasonable allowance for salaries or other compensation for personal services actually rendered;" | The Tax Manager enters into his computer the language of the Judgment stating "The Court finds that John Q. Acme is entitled to recover from Company XYZ the sum of $1,000,000 as compensation for personal services provided by him to Company XYZ, of which $850,000 is payable within 10 days of the date of this order and of which $150,000 is payable 30 days after Company XYZ collects from its customers the $1,500,000 in fees for which John Q. Acme is entitled to be paid a 10% commission." | 204B |
| 206A | The Tax Manager then uses his computer to look up in an online tax research application the Income Tax Regulations promulgated by the Secretary of the Treasury under Code Section 162 and notes that regulation Section 1.162-1(a) states "Business expenses deductible from gross income include the ordinary and necessary expenditures directly connected with or pertaining to the taxpayer's trade or business . . . Among the items included in business expenses are management expenses, commissions . . . ." | The computer searches the Internal Revenue Code and Treasury Regulations contained in its database for each of the words listed in the language of the Judgment that was entered by the Tax Manager and the words "deductibility" and "payments" entered by the Tax Manager in his question (the software ignores prepositions such a "of") and identifies, based on the number of similarities of words, that Section 162 of the Internal Revenue Code as the most likely section that applies to this issue. The system compares the | 206B |

*FIG. 2A*

| | | words in the judgment and those in Code Section 162 stating that a taxpayer is "allowed as a deduction all the ordinary and necessary expenses paid or incurred during the taxable year in carrying on any trade or business, including – (1) a reasonable allowance for salaries or other compensation for personal services actually rendered;" and determines that section 162 is the section to look at to determine an answer to the question. | |
|---|---|---|---|
| 208A | The Tax Manager then uses his computer to look up in an online tax research application to read the list of all regulations promulgated under Section 162 (listed in regulation 1.162-0) and notes that regulation 1.162-7 is titled "Compensation for personal services." | The system then compares the language in the judgment to the Treasury Regulations in its database and identifies regulations 1.162-1 and 1.162-7 as being the regulations that govern this issue because the word "commission" appears in regulation 1.162-1 and "compensation" appears in regulation 1.162-7. | 208B |
| 210A | The Tax Manager uses his computer to look up in an online tax research application to read regulation 1.162-7 and notices that it states the following: "There may be included among the ordinary and necessary expenses paid or incurred in carrying on any trade or business a reasonable allowance for salaries or other compensation for personal services actually rendered." | The system selects from regulation 1.162-7 the sentence "There may be included among the ordinary and necessary expenses paid or incurred in carrying on any trade or business a reasonable allowance for salaries or other compensation for personal services actually rendered." The computer also selects from regulation 1.162-1 the language in 1.162-1(a) that reads as follows: "Business expenses deductible from gross income include the ordinary and necessary expenditures directly connected with or pertaining to the taxpayer's trade or business, except items which are used as the basis for a deduction or a credit under provisions of law other than section 162." | 210B |
| 212A | The Tax Manager then reads the memorandum from XYZ's Chief Accounting Officer dated September 8, 2015, and notes that it states ". . . Company XYZ must record a liability in its financial statements for the month ending September 30, 2015 the full amount of the Judgment of $1,000,000 in favor of Mr. Acme. This liability will be reflected as additional compensation | The system then compares the language from the Judgment typed into the dialog box by the Tax Manager with the language it selected from section 162, regulation 1.162-1, and regulation 1.162-7 and determines, based on the high percentage of words that exist both in the language from the Judgment and the language from the | 212B |

*FIG. 2B*

| | | | |
|---|---|---|---|
| | expense of Company XYZ." | sentences or phrases in the Code and regulations identified by the system as relevant, that the best answer to the question posed to it is that the payments required by the Judgment are deductible under section 162 and regulation 1.162-1 and 1.162-7. | |
| 214A | The Tax Manager notes that (a) the Judgment describes the payment owed to Mr. Acme to be "compensation for personal services provided by him to Company XYZ," (b) the memorandum issued by the General Counsel describes the payments owed to Mr. Acme as "commission compensation," and that the memorandum from the Chief Accounting Officer states "This liability will be reflected as additional compensation expense of Company XYZ." | The system opens a window on the Tax Manger's desktop in which the following appears:<br><br>Issue: Deduction of compensation<br>Facts: The Court finds that John Q. Acme is entitled to recover from Company XYZ the sum of $1,000,000 as compensation for personal services provided by him to Company XYZ, of which $850,000 is payable within 10 days of the date of this order and of which $150,000 is payable when Company XYZ collects from its customers the $1,500,000 in fees for which John Q. Acme is entitled to be paid a 10% commission."<br>Governing Law:<br>162(a) In general There shall be allowed as a deduction all the ordinary and necessary expenses paid or incurred during the taxable year in carrying on any trade or business, including – (a) a reasonable allowance for salaries or other compensation for person services actually rendered;<br>1.162-1 (a) "Business expenses deductible from gross income include the ordinary and necessary expenditures directly connected with or pertaining to the taxpayer's trade or business, except items which are used as the basis for a deduction or a credit under provisions of law other than section 162."<br>1.162-7 (a) "There may be included among the ordinary and necessary expenses paid or incurred in carrying on any trade or business a reasonable allowance for salaries or other compensation for personal services actually rendered."<br>Conclusion: deduction allowed | 214B |

*FIG. 2C*

| | | | |
|---|---|---|---|
| 216A | The Tax Manager notes that "compensation" is listed in regulation 1.162-7 as an allowable business expense deduction under Section 162, that regulation 1.162-1 lists "commissions" as a type of payment that is deductible under Section 162, and that the phrase "compensation for personal services" appears in both the Judgment and in Code Section 162. Because the Judgment and internally prepared legal and accounting memoranda all describe the payments order by the court as compensation and/or commissions, and tax regulations list "commissions" and "compensation" as deductible by the taxpayer who pays those expenses, and the language of the Judgment matches the word "compensation" appears in the judgment, the Code and the Regulations, the Tax Manager concludes that the $1,000,000 of payments to be made to Mr. Acme are deductible "salaries or other compensation for personal services actually rendered" as defined in Section 162 of the Code and regulations 1.162-1 and 1.162-7. | *The Tax Manager reads the response provided by the computer software, accepts it, and proceeds to the next issue.* | 216B |
| 218A | *Resolution of Issue #1: The Tax Manager therefore concludes the payments required by the Judgment are deductible by Company XYZ.* | *Resolution of Issue #1: The system provides a recommendation to the Tax Manager that the payments required by the Judgment are deductible under section 162 and regulations 1.162-1 and 1.162-7 of the Internal Revenue Code. The Tax Manager accepts this recommendation.*<br>Note: the system differs from what existing "tax research" software does in that existing tax software pulls up a list of authorities that contain words that match the words entered into the "search" box of their software and require the human being to read all of those authorities himself and decide which of them apply and what the likely tax result would be. The exemplary system not only identifies the controlling authorities but also resolves the question of whether the answer to the question | 218B |

*FIG. 2D*

| | | | |
|---|---|---|---|
| | | "are the payments deductible" is "yes" or "no". Under the exemplary system the Tax Manager need not use his computer continuously to look up tax authorities in a commercial tax research software maintained by a third party on a server; the system does this once and reaches a conclusion about the most likely tax result much more quickly, and with less computer time being used, than under current manual approaches. | |
| 220A | Issue #2: Determination of when the payments required to be made under the Judgment will be deductible. | Issue #2: Determination of when the payments required to be made under the Judgment will be deductible. | 220B |
| 222A | The Tax Manager examines the Judgment to determine when payments are required to be made under it and notes that the Judgment was rendered on September 5, 2015 and requires one payment of $850,000 to be made within 30 days of the date the Judgment was issued and an additional $150,000 to be paid within 30 days of the date Company XYZ collects from its customers the revenue from sales made by John Q. Acme on behalf of Company XYZ. | [System follows the same steps to resolve issue #2 as it did in resolving issue #1] | 222B |
| 224A | The Tax Manager reads the Legal Analysis Memorandum analyzing the Judgment prepared by the General Counsel and notes that the exact date on which the remaining $150,000 must be paid to John Q. Acme cannot be determined as of the date of the Judgment but that the General Counsel expects the $150,000 to be paid to Mr. Acme sometime during the first 6 months of 2017. | | 224B |
| 226A | The Tax Manager then reviews the memorandum prepared by the Chief Accounting Officer and notes that it states "because Company XYZ uses the accrual method of accounting to reflect the results of its operations in its financial statements, I have concluded that Company XYZ must record a liability in its financial statements for | | 226B |

*FIG. 2E*

| | | | |
|---|---|---|---|
| | the month ending September 30, 2015 the full amount of the Judgment of $1,000,000 in favor of Mr. Acme." | | |
| 228A | The Tax Manager then consults the index of the Internal Revenue Code and identifies the following sections of the Code that are relevant for purposes of this analysis: Section 446 – General rule for methods of accounting; and Section 461 - "General rule for taxable year of deduction." | | 228B |
| 230A | The Tax Manager notes that Section 461(a) states as follows: "General rule – The amount of any deduction or credit allowed by this subtitle shall be taken for the taxable year which is the proper taxable year under the method of accounting used in computing taxable income." | | 230B |
| 232A | The Tax Manager reviews Section 446 and notes that Section 446(a) states "General rule – taxable income shall be computed under the method of accounting on the basis of which the taxpayer regularly computes his income in keeping his books." | | 232B |
| 234A | The Tax Manager compares the language of this Section with the statement in the Chief Accounting Officer's memorandum that "Company XYZ uses the accrual method of accounting to reflect the results of its operations in its financial statements" and concludes, because the Chief Accounting Officer has stated that Company XYZ uses the "accrual method of accounting," the accrual method is the "method of accounting on the basis of which the taxpayer [i.e., XYZ Company] regularly computes his [its] income in keeping his [its] books" as stated in Section 446(a) of the Code. | | 234B |
| 236A | The Tax Manager therefore concludes that because the phrase "accrual method" is used both by the Chief Accounting Officer in his memorandum and in Section 461(a) of the internal revenue Code, Company XYZ is | | 236B |

*FIG. 2F*

| | | | |
|---|---|---|---|
| | required under Section 461 of the Code to use the accrual method of accounting. | | |
| 238A | The Tax Manager reviews the list of regulations promulgated under Code Section 461 that is contained in regulation Section 1.461-0 and notices that regulation 1.461-1 is "General rule for taxable year of deduction. | | 238B |
| 240A | He reads this regulation and takes note of the following language in Section 1.461-1(a)(2) ". . . under an accrual method of accounting, a liability is incurred, and generally is taken into account for federal income tax purposes, in the taxable year in which all the events have occurred that establish the fact of the liability, the amount of the liability can be determined with reasonable accuracy, and economic performance has occurred with respect to the liability." | | 240B |
| 242A | He again consults the list of regulations issued under Section 461 and identifies as relevant to the question of when economic performance occurs for purposes of regulation Section 1.461-1(a)) regulation 1.461-4, which is entitled "Economic performance." | | 242B |
| 244A | He reads that regulation and takes note of Section 1.461-4(g)(2), which states "If the liability of a taxpayer requires a payment or series of payments to another person and arises under any . . . breach of contract . . . economic performance occurs as payment is made to the person to which the liability is owed." Because a "breach of contract" is listed in regulation 1.461-4(g)(2) as a liability for which economic performance is treated as occurring when payment is made, the Tax Manager concludes that of the $1,000,000 payment $850,000 will have met the "economic performance" requirement in 2015 since that portion of the payment will be made during 2015 and $150,000 will become deductible in 2017 when economic performance with respect to that portion of the liability (i.e., the payment of that | | 244B |

*FIG. 2G*

| | | | |
|---|---|---|---|
| | $150,000) occurs. | | |
| 246A | Resolution of Issue #2: The Tax Manager concludes that $850,000 is deductible by Company XYZ in its 2015 tax year and $150,000 will be deductible in 2017 assuming it is paid in 2017. | Resolution of Issue #2: The system provides a recommendation to the Tax Manager that $850,000 is deductible by Company XYZ in its 2015 tax year and $150,000 will be deductible in 2017 assuming it is paid in 2017. The Tax Manager accepts this recommendation. | 246B |
| 248A | Issue #3: In what financial statement reporting period are the tax consequences of the Judgment to be recorded on the company's books? | Issue #3: In what financial statement reporting period are the tax consequences of the Judgment to be recorded on the company's books? | 248B |
| 250A | Tax Manager reviews Section 25-18 of Accounting Standards Codification Topic 740 issued by the Financial Accounting Standards Board which states "Income taxes currently payable for a particular year usually include the tax consequences of most events that are recognized in the financial statements for that year." | [System follows the same steps to resolve issue #3 as it did in resolving issues #1 and #2 except that the Tax Manager selects from a drop-down menu "tax accounting" and as a result the system reviews its database of accounting standards rather than its database of federal income tax code and regulations.] | 250B |
| 252A | The Tax Manager reads ASC topic 740-25-19 which states "However because tax laws and financial accounting standards differ in their recognition and measurement of assets, liabilities, equity, revenues, expenses, gains, and losses, differences arise between the amount of taxable income and pretax financial income for a year and the tax bases of assets or liabilities and their reported amounts in financial statements." | | 252B |
| 254A | Based on these statements, and the decision by the Chief Accounting Officer to record an expense and associated liability of $1 million in the company's books and records for September, 2015, the Tax Manager concludes that despite the fact that Company XYZ will not deduct the payments made in years after 2015 until they are made, Company XYZ in its consolidated financial statements must record the full tax consequences of the Judgment in its books and records for the | | 254B |

*FIG. 2H*

| | | | | |
|---|---|---|---|---|
| | month ending September 30, 2015. | | | |
| 256A | Resolution of Issue #3: Company XYZ must record in its financial statements for the month ending September 30, 2015 the full amount of the tax consequences of the Judgment. | | Resolution of Issue #3: The system provides a recommendation to the Tax Manager that Company XYZ must record in its financial statements for the month ending September 30, 2015 the full amount of the tax consequences of the Judgment. The Tax Manager accepts this recommendation. | 256B |
| 258A | Issue #4: what are the entries to be made in the company's books for the month ending September 30, 2015 to record the tax effects of the Judgment? | | | 258B |
| 260A | The Tax Manager once again reviews the memorandum prepared by the Chief Accounting Officer and notes that the $150,000 liability that will be paid in 2017 will be recorded as a non-current liability because it will not be paid within 12 months. Because the tax deduction for that $150,000 payment will likewise be taken in 2017, and the Chief Accounting Officer's memorandum states that any tax assets to be recorded as a result of this Judgment should be recorded as long-term tax assets if the future tax savings represented by those assets are expected to be collected in more than 12 months, the Tax Manager concludes that the reduction in XYZ's future tax liabilities related to that $150,000 payment (i.e., the "tax benefit" related to the $150,000 liability XYZ accrues on its books in 2015 that will be paid in 2017) is properly reflected as a "non-current tax asset" on XYZ's books. | | [System follows the same steps to resolve this step in issue #4 as it did in resolving issues #1, 2 and 3 except that the Tax Manager selects from a drop-down menu "tax accounting" and as a result the system reviews its database of accounting standards rather than its database of federal income tax code and regulations.] | 260B |
| 262A | Consults with the company's state and local tax manager who reviews the Judgment and the summary of the case provided by the Legal Department and determines that the $1 million payment will be deductible in California where XYZ is headquartered but not in any other state. The State Tax Manager further confirms, based on his reading of California law, that the California corporate tax rate is 8.84% and that it is deductible for purposes of determining XYZ's | | [System follows the same steps to resolve this step in issue #4 as it did in resolving issues #1, 2 and 3 except that the Tax Manager selects from a drop-down menu "California and federal tax rates" and as a result the software program reviews its database of California tax law and regulations rather than its database of federal income tax code and regulations and consults the federal tax rate tables in its database. | 262B |

*FIG. 21*

|  | federal tax liability. The Tax Accounting Manager and the State Tax Manager jointly determine that the state tax benefit to be recorded for this judgment is equal to the California corporate income tax rate of 8.84% multiplied by (100% minus the 35% federal tax rate), or 65%, which produces a net state tax rate of 5.46%. That 5.46% rate is multiplied by the amount of the deductible payment that will be made to the former employee to determine the state tax benefit that Company XYZ will obtain from this payment. | The Proposed Method identifies from its database that the California corporate tax rate is 8.84% and that it is deductible for purposes of determining XYZ's federal tax liability and that the state tax benefit to be recorded for this judgment is equal to the California corporate income tax rate of 8.84% multiplied by (100% minus the 35% federal tax rate), or 65%, which produces a net state tax rate of 5.46%. That 5.46% rate is multiplied by the amount of the deductible payment that will be made to the former employee to determine the state tax benefit that Company XYZ will obtain from this payment.] |  |
|---|---|---|---|
| 264A | *Resolution of Issue #4: the Tax Manager determines that the following entries should be recorded in the books and records of Company XYZ during September, 2015:* | *Resolution of Issue #4: The system develops and posts to Company XYZ's general ledger system the following entries during September, 2015:* | 264B |
| 266A | DR-Current Federal Income Tax Payable LE#201:    $297,500 | DR-Current Federal Income Tax Payable LE#201:    $297,500 | 266B |
| 268A | CR-Current Federal Income Tax Expense LE# 201:    $297,500 | CR-Current Federal Income Tax Expense LE# 201:    $297,500 | 268B |
| 270A | DR-Current California Income Tax Payable LE# 201:    $48,841 | DR-Current California Income Tax Payable LE# 201:    $48,841 | 270B |
| 272A | CR-Current Federal Income Tax Expense LE# 201:    $48,841 | CR-Current Federal Income Tax Expense LE# 201:    $48,841 | 272B |
| 274A | Explanation entered into company records for this entry: "To record <u>current portion</u> of federal and state tax benefit resulting from the anticipated payment by Company XYZ, of the $1 million judgment against Company XYZ for compensation. Formulae:  Current Federal tax benefit = $850,000 x 35%.  Current California tax benefit = $850,000 x 8.84% x (1-.35)." | Explanation entered into company records for this entry: "To record <u>current portion</u> of federal and state tax benefit resulting from the anticipated payment by Company XYZ, of the $1 million judgment against Company XYZ for compensation computed as follows: Current Federal tax benefit = $850,000 x 35%. Current California tax benefit = $850,000 x 8.84% x (1-.35)." | 274B |
| 276A | DR-Deferred Federal Income Tax Asset LE#201        $52,500 | DR-Deferred Federal Income Tax Asset LE#201        $52,500 | 276B |
| 278A | CR-Deferred Federal Income Tax Expense LE#201        $52,500 | CR-Deferred Federal Income Tax Expense LE#201        $52,500 | 278B |
| 280A | DR-Deferred California Income Tax Asset LE#201        $8,619 | DR-Deferred California Income Tax Asset LE#201        $8,619 | 280B |

*FIG. 2J*

| | CR-Deferred California Income Tax Expense LE#201     $8,619 | CR-Deferred California Income Tax Expense LE#201     $8,619 | |
|---|---|---|---|
| 282A | Explanation entered into company records for this entry: To record the deferred tax asset (and corresponding reduction in the company's future tax payments) of federal and state tax benefit resulting from deducting in future years the anticipated payment in future years by Company XYZ, the $150,000 portion of the judgment awarded by the judge against Company XYZ for compensation that is expected to be deducted in 2017 when paid instead of in 2015.   Formulae:  Deferred Federal tax benefit = $150,000 x 35%. Deferred California tax benefit = $150,000 x 8.84% x (1-.35). | Explanation entered into company records for this entry: To record the deferred tax asset (and corresponding reduction in the company's future tax payments) of federal and state tax benefit resulting from deducting in future years the anticipated payment in future years by Company XYZ, the $150,000 portion of the judgment awarded by the judge against Company XYZ for compensation that is expected to be deducted in 2017 when paid instead of in 2015.   Formulae: Deferred Federal tax benefit = $150,000 x 35%. Deferred California tax benefit = $150,000 x 8.84% x (1-.35). | 282B |
| 284A | Manager, Tax Accounting uses his computer to enter into Company XYZ's general ledger accounting system the entries listed above. | System sends an email to the Tax Manager with the following summary of the work it performed:<br><br>Issue #1: Deduction of compensation<br>Facts: The Court finds that John Q. Acme is entitled to recover from Company XYZ the sum of $1,000,000 as compensation for personal services provided by him to Company XYZ, of which $850,000 is payable within 10 days of the date of this order and of which $150,000 is payable when Company XYZ collects from its customers the $1,500,000 in fees for which John Q. Acme is entitled to be paid a 10% commission."<br>Governing Law:<br>162(a) In general There shall be allowed as a deduction all the ordinary and necessary expenses paid or incurred during the taxable year in carrying on any trade or business, including – (a) a reasonable allowance for salaries or other compensation for person services actually rendered;<br>1.162-1 (a) "Business expenses deductible from gross income include the ordinary and necessary expenditures directly connected with or pertaining to | 284B |

*FIG. 2K*

| | | the taxpayer's trade or business, except items which are used as the basis for a deduction or a credit under provisions of law other than section 162."<br>1.162-7 (a) "There may be included among the ordinary and necessary expenses paid or incurred in carrying on any trade or business a reasonable allowance for salaries or other compensation for personal services actually rendered."<br><u>Conclusion</u>: deduction allowed<br><br>Issue #2: [same format as for issue #1]<br><br>Issue #3: [same format as for issues #1 and #2<br><br>Issue #4: Exact journal entries and explanations for those entries entered into XYZ's general ledger system, plus a summary of the steps taken by the Proposed Method in calculating those entries, e.g.:<br><br>"the California corporate tax rate is 8.84% and that it is deductible for purposes of determining XYZ's federal tax liability and that the state tax benefit to be recorded for this judgment is equal to the California corporate income tax rate of 8.84% multiplied by (100% minus the 35% federal tax rate), or 65%, which produces a net state tax rate of 5.46%. That 5.46% rate is multiplied by the amount of the deductible payment that will be made to the former employee to determine the state tax benefit that Company XYZ will obtain from this payment." | |

*FIG. 2L*

DETERMINING CORRECT ANSWERS TO TAX AND ACCOUNTING ISSUES ARISING FROM BUSINESS TRANSACTIONS AND GENERATING ACCOUNTING ENTRIES TO RECORD THOSE TRANSACTIONS USING A COMPUTERIZED PREDICATE LOGIC IMPLEMENTATION

CROSS-REFERENCE TO RELATED APPLICATION(S)

This application claims the benefit of U.S. Provisional Application Ser. No. 62/059,935, filed on 5 Oct. 2014, the complete disclosure of which is expressly incorporated herein by reference in its entirety for all purposes.

FIELD OF THE INVENTION

The present invention relates generally to the electronic and computer arts, and, more particularly, to tax and accounting software and associated computer-aided legal decision support techniques.

BACKGROUND OF THE INVENTION

The generation of accounting entries from transactions and economic events (referred to hereinafter as "transactions" for brevity) is currently handled by an inefficient process consisting of several steps. First, a person (the accountant) reviews information such as contracts, memoranda, and court decisions that create or describe the transaction or event so that the accountant can understand the consequences of the transaction to the business or company affected by the transaction. Throughout this document "company" and "business" will be used interchangeably to refer to a business enterprise. Second, the accountant must determine how that transaction should be treated under the principles of accounting applicable to the company or business affected by the transaction. In the United States, the accounting principles applicable to businesses are primarily found in U.S. Generally Accepted Accounting Principles ("U.S. GAAP"). Third, the accountant must determine the correct accounting entries to be recorded in the company's books and records to reflect the effect of the transaction on the company's financial condition. Finally, the accountant must record those entries in the company's books and records. Once the entries have been recorded, they are typically reviewed or "audited" by an independent firm of certified public accountants ("CPAs").

When a transaction affects a company subject to U.S. GAAP, that company is required to record in its financial records both the economic effects of the transaction and the tax (income and other tax) consequences of the transaction on the company. Recording the tax consequences of a transaction in a company's financial records requires the accurate application of the relevant tax law to the transaction. The accountant who generates the accounting entry to record a transaction must therefore determine the tax consequences of the transaction to the company, either by his own efforts or by relying on another individual (typically a CPA or attorney) knowledgeable in the area of tax law applicable to the transaction. Current legal and tax research software assists an attorney or CPA in identifying relevant authorities that govern the tax consequences of various transactions and economic events, but does not provide assistance in applying those authorities to the facts and circumstances of a particular case.

SUMMARY OF THE INVENTION

Principles of the present invention provide techniques for determining correct answers to tax and accounting issues arising from business transactions and generating accounting entries to record the tax and accounting consequences of those transactions using a computerized predicate logic implementation.

In one aspect, an exemplary method includes paraphrasing at least one pertinent authority, in ordinary English language, into a series of intermediate forms, said at least one pertinent authority comprising at least one of a tax authority and an accounting authority; rendering said series of intermediate forms into a corresponding series of logical statements; and encoding said series of logical statements into relations in a logic programming language.

Aspects of the invention contemplate the method(s) performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a tangible computer readable recordable storage medium with computer usable program code for performing the method steps indicated stored thereon in a non-transitory manner. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein. Transmission medium(s) per se and disembodied signals per se are defined to be excluded from the claimed means.

One or more embodiments of the invention can provide substantial beneficial technical effects; for example:

use of less computer CPU time and/or less network bandwidth than current techniques by using a centrally located computer to maintain databases and process information that under current techniques are maintained and performed on multiple computers used by multiple individuals at different locations around the world;

addressing English punctuation anomalies that hinder text processing of English-language text by computers;

providing a mobile alert architecture to a corporate tax team notifying that team when accounting entries for the tax consequences of transactions have been processed by the system and are ready to be recorded in the company's records; and implementing semantic rules applicable to the legally correct interpretation of U.S. statutes and other judicial and regulatory authorities in a natural language understanding system that current computer technology is unable to implement.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 1A and 1B (collectively FIG. 1) show an exemplary process flow chart illustrating the steps followed to record the tax consequences of a business event (in this example a court judgment), at least a portion of which can be implemented in accordance with aspects of the invention;

FIGS. 2A-2L (collectively FIG. 2) show an exemplary process flow chart, comparing how step 8 of FIG. 1 can be implemented in accordance with aspects of the invention as compared to with current techniques;

DETAILED DESCRIPTION OF PREFERRED EMBODIMENTS

Principles of the present invention provide techniques for generating accounting entries from transactions and/or techniques to determine the answer to a legal question under tax law for purposes other than the recordation of actual transactions in a business's books. An example of the latter is determining the most likely answer to a tax law question so that the person who asks the question can obtain "advice" from the computer as to the likely result under tax law. However, for purposes of initial illustration, a non-limiting exemplary embodiment will be described in the context of a decision concerning the deductibility of a payment under tax law and the tax accounting entries required to record that payment in a company's books and records.

One or more embodiments provide techniques and products that allow the accountant responsible for recording transactions in a business' books and records to obtain assistance from a computer system in determining how tax law and U.S. GAAP are to be applied to those transactions.

Figure 1A:
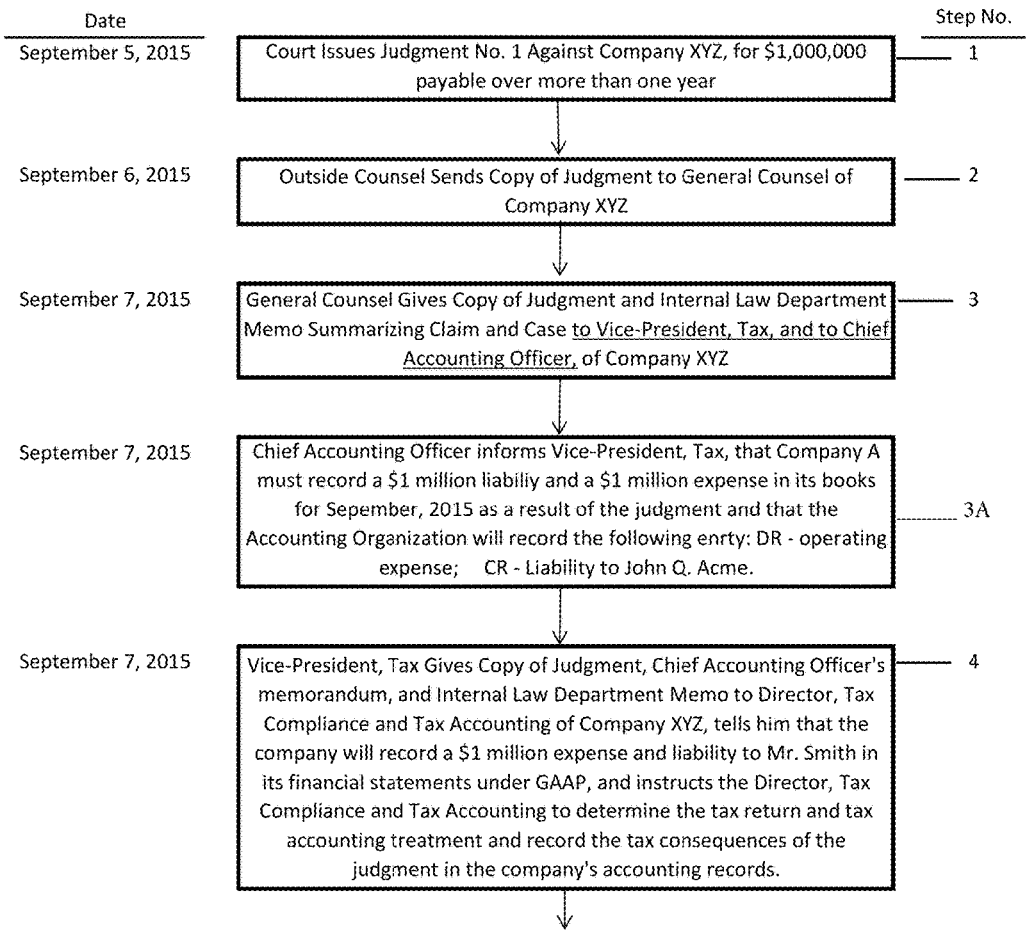

Referring now to FIG. 1, an accounting process flow chart is depicted for an example involving a tax and accounting decision. The chart is based on the exemplary general counsel memorandum in Table 1 and exemplary chief accounting officer memorandum in Table 2; the two tables are in turn based on a hypothetical court judgment shown in Table 3.

TABLE 1

EXEMPLARY GENERAL COUNSEL MEMORANDUM

| | |
|---|---|
| Date: | Sep. 7, 2015 |
| To: | CEO, Company XYZ |
| | CFO, Company XYZ |
| | Chief Accounting Officer, Company XYZ |
| | Vice-President of Tax, Company XYZ |
| From: | General Counsel, Company XYZ |
| Re: | Claim of John Q. Acme — Judgment rendered Sep. 5, 2015 |

On Sep. 5, 2015 a judgment was entered against Company XYZ by the District Court of Santa Clara County, California in favor of John Q. Acme in the amount of $1,000,000. Mr. Acme was an employee of Company XYZ until approximately one year ago when his employment was terminated by Company XYZ. Mr. Acme brought suit against Company XYZ for $1,000,000 he claimed was owed him under the terms of his employment agreement with Company XYZ, alleging that Company XYZ had terminated him after he secured sales agreements with customers in the amount of $10,000,000 but before the commissions owed to him as compensation for securing those sales agreements had been paid. Mr. Acme also asserted that under the terms of his employment agreement he was entitled to be paid a 10% commission on the sales he made on Company XYZ's behalf with payment of those commissions being due 30 days after Company XYZ was paid by the customer.

Although Company XYZ terminated Mr. Acme for what it believed to be just cause and had no obligation to pay Mr. Acme the commissions due him under his employment agreement, the Santa Clara District Court found in favor of Mr. Acme and issued the attached judgment. Of the $10 million in sales Mr. Acme secured for Company XYZ prior to his termination, and for which he was not paid commissions at the time of his termination, $8,500,000 have been paid to Company XYZ by its customers as of Aug. 31, 2015. The remaining $1,500,000 is expected to be collected by Company XYZ from its customer sometime during 2017. In upholding Mr. Acme's claim to payment, the Santa Clara District Court ruled that Company XYZ is required to pay Mr. Acme, as additional compensation, commissions of $850,000 no later than Oct. 5, 2015 as those revenues have already been collected by Company XYZ. The remaining revenues of $1,500,000 are expected to be collected by Company XYZ sometime during the first 6 months of 2017; under the judgment Company XYZ will become obligated to pay Mr. Acme the remaining $150,000 of commission compensation within 30 days of the date Company XYZ collects those revenues from its customers.

TABLE 2

EXEMPLARY CHIEF ACCOUNTING OFFICER MEMORANDUM

Date: Sep. 8, 2015
To: CEO, Company XYZ
 CFO, Company XYZ
 Vice-President of Tax, Company XYZ
From: Chief Accounting Officer, Company XYZ
Re: Claim of John Q. Acme — Judgment rendered Sep. 5, 2015

I have reviewed the judgment rendered against Company XYZ by the Santa Clara County district court and the legal memorandum provided to me by the General Counsel. Because the general counsel expects Company XYZ to pay Mr. Acme during 2015 the $850,000 of commissions found to be owed by the court no later than Oct. 5, 2015, and to pay Mr. Acme during 2017 the remaining $150,000 of commissions, and because Company XYZ uses the accrual method of accounting to reflect the results of its operations in its financial statements, I have concluded that Company XYZ must record a liability in its financial statements for the month ending Sep. 30, 2015 the full amount of the judgment of $1,000,000 in favor of Mr. Acme. This liability will be reflected as additional compensation expense of Company XYZ. The entry the accounting department will make to reflect the issuance of this judgment is as follows:

| | | |
|---|---|---|
| Debit: | Employee Compensation Expense | $1,000,000 |
| Credit: | Current Liabilities (because this will be paid within 12 months) | $850,000 |
| Credit: | Noncurrent Liabilities (because this will not be paid within 12 months) | $150,000 |

Any tax entries made as a result of this judgment should be recorded consistent with this accounting entry, that is, tax assets recorded as a result of this judgment should be recorded as current assets if they are expected to be realized (e.g., if cash tax savings are expected to be obtained from the government) within 12 months, and tax assets recorded as a result of this judgment should be recorded as non-current assets if they are expected to be realized (tax savings obtained from the government) in more than 12 months.

TABLE 3

HYPOTHETICAL COURT JUDGMENT

CAUSE No. _____

| | |
|---|---|
| John Q. Acme, Plaintiff | IN THE DISTRICT COURT OF |
| v. | SANTA CLARA COUNTY, |
| Company XYZ, Defendant | CALIFORNIA |

JUDGMENT

On this date the Court, having heard the facts and evidence submitted by the parties, and having received and considered all the pleadings on file and the arguments of counsel, finds the defendant, Company XYZ, liable to John Q. Acme by reason of Company XYZ's termination of John Q. Acme's employment without payment of amounts owed to John Q. Acme under the terms of his employment agreement with Company XYZ. The Court finds that John Q. Acme is entitled to recover from Company XYZ the sum of $1,000,000 as compensation for personal services provided by him to Company XYZ, of which $850,000 is payable within 10 days of the date of this order and of which $150,000 is payable when Company XYZ collects from its customers the $1,500,000 in fees for which John Q. Acme is entitled to be paid a 10% commission.

It is therefore ORDERED, ADJUDGED AND DECREED that Company XYZ shall pay John Q. Acme the sum of $850,000 within 30 days of the date of this order and shall pay John Q. Acme an additional $150,000 for future compensation for services rendered to Company XYZ, the $150,000 being payable 30 days after Company XYZ collects from its customers the revenue attributable to sales made by John Q. Acme during the term of his employment with Company XYZ. No interest shall be owed by defendant on amounts ordered herein to be paid unless such amounts are not paid timely, in which case interest shall be owed at the judicial rate of interest calculated from the date the payment becomes due.

SIGNED and ENTERED this 5th day of Sep. 2015.

_____
Hon. Jones F. Smith, District Judge

In step 1 of FIG. 1, on Sep. 5, 2015, the court issues a judgment against Company XYZ for $1,000,000 payable over a time period of more than one year. In step 2 of FIG. 1, on Sep. 6, 2015, Company XYZ's outside law firm sends a copy of the judgment to the General Counsel. In step 3 of FIG. 1, on Sep. 7, 2015, the General Counsel provides a copy of the judgment and the memo of Appendix 1 to Company XYZ's VP of Tax and Chief Accounting Officer. In step 3A of FIG. 1, on Sep. 7, 2015, the Chief Accounting Officer informs the VP of Tax of the liabilities and expenses that must be recorded on the books as a result of the judgment. Note that DR=debit and CR=credit. This could be done, for example, by the memo set forth in Table 2 (which is dated September 8; the dates are non-limiting examples and step 3A and the memo could be on the same day). In step 4 of FIG. 1, on Sep. 7, 2015, the VP of Tax provides the Director, Tax Compliance and Tax Accounting of Company XYZ with the judgment and the memoranda prepared by Company XYZ's General Counsel and Chief Accounting Officer (Tables 3, 1 and 2, respectively); tells him that the company will record in the current accounting period a $1 million expense and liability to Mr. Smith in its financial statements under generally accepted accounting principles (GAAP), and instructs the Director, Tax Compliance and Tax Accounting to determine the tax return and tax accounting treatment of the judgment and record the tax consequences of the judgment in the company's accounting records.

In step 5, on Sep. 10, 2015, the Director, Tax Compliance and Tax Accounting performs a cursory review of the judgment and Internal Law Department Memo and concludes, based on his knowledge of the Internal Revenue Code, that the payments are probably deductible by XYZ. In step 6, on Sep. 10, 2015, the Director, Tax Compliance and Tax Accounting performs a cursory review of the rules published by the FASB (Financial Accounting Standards Board) and concludes that, despite the fact that Company A will not deduct on its federal income tax return the payments made in years after 2015 until they are made, Company XYZ must record the full tax consequences of the judgment in its books and records for the month ending Sep. 30, 2015. In step 7, on Sep. 11, 2015, the Director, Tax Compliance and Tax Accounting provides the pertinent materials indicated to the Tax Manager and instructs him to make the appropriate entries in the accounting records. In step 8, discussed further below with regard to FIG. 2, appropriate analyses of the tax law and accounting rules applicable to the judgment are carried out either by the tax manager or by a system developed in accordance with aspects of the invention in order to reach a decision about the correct treatment of the judgment under tax law and accounting principles. In step 12, an outside public accounting firm hired to audit Company XYZ reviews the company's treatment of the judgment under applicable tax law and the way the company recorded the tax consequences of the judgment on the company in its books and records.

FIG. 2 shows exemplary steps that can be used to carry out step 8 in both the prior art (left-hand column) and using an exemplary system in accordance with aspects of the invention (right-hand column). Steps carried out using the prior art are numbered with an appended "A" while corresponding steps in accordance with aspects of the invention are numbered with an appended "B."

Step 201 involves identifying the first issue, namely, whether Payments required by the Judgment are Deductible? In step 202A, the Tax Manager reads the judgment and identifies words he believes are pertinent to determining if the payment required by the judgment is deductible by the company. In step 202B, the Tax Manager employs a user interface with a software program implementing aspects of the invention to indicate pertinent keywords "deduction" and "compensation" and to indicate that initially, it is Federal taxes that are at issue. Note that details regarding menu structures are merely illustrative and other embodiments can use other types of user interfaces. In step 204A, the Tax Manager carries out traditional online tax research with regard to pertinent provisions of the Internal Revenue Code by typing into a search box in one of the existing online tax research systems the key words he determined to be pertinent to resolve the issue of whether the payment is deductible by Company XYZ. In step 204B, the Tax Manager enters the pertinent language from the judgment into his computer, by typing, cutting and pasting, carrying out a file read, optical character recognition, speech recognition, or other suitable technique. In step 204B, the Tax Manager also types into the computer the following language from the Judgment: "Date of this order is Sep. 5, 2015."

In step 206A, the Tax Manager carries out traditional online tax research with regard to pertinent provisions of the Income Tax Regulations by typing into a search box in one of the existing online tax research systems the key words he determined to be pertinent to resolve the issue of whether the payment is deductible by Company XYZ (the Tax Manager could also simultaneously search the Internal Revenue Code and Income Tax Regulations for the pertinent key words using an existing online tax research system. In this non-limiting example the searches conducted by the Tax Manager of the Internal Revenue Code and Income Tax Regulations are described as occurring separately to more clearly illustrate the application of tax research techniques using both the current art and the proposed invention). In step 206B, the system searches the Internal Revenue Code and Treasury Regulations contained in its Federal tax database for each of the words listed in the language of the Judgment that was entered by the Tax Manager in step 204B and also for the words "deductibility" and "payments" (or "deduction" and "compensation") entered by the Tax Manager in his question in step 202B. The software typically ignores prepositions such as "of" or other so-called "stop words." (In computing, "stop words" are words which are filtered out before or after processing of natural language data (text)). Furthermore, in some instances, the system may not search for all the words in the language of the Judgment less "stop words", but may only extract certain significant topic words. Techniques of natural language processing and/or natural language understanding can be employed, for example (see also discussion below regarding facilitating search using extensible markup language (XML)). Based on the pertinent words in the judgment and the entered terms "deductibility" and "payments" (or "deduction" and "compensation"), the system selects the governing section of the Internal Revenue Code. Note that in some cases, only input query words might be used, while in other cases, only text from a judgment or other pertinent document might be used. Both are used in the non-limiting example. For example, one or more embodiments could be programmed to search for words in the judgment other than "stop words", which "stop words" might include words commonly used in the English language but that have no particular significance under federal income tax law. The words in the judgment selected in this way would then be used to search the computer system's database of tax laws so that the sections of the internal revenue code and regulations with the highest probability of relevance to the question posed by the Tax Manager are chosen as the governing legal authority (again, see also discussion below regarding facilitating search using extensible markup language (XML)).

In step 208A, the Tax Manager carries out traditional online tax research with regard to pertinent provisions of the Income Tax Regulations. In step 208B, the system operates in a similar fashion as in step 206B to identify pertinent regulations. In step 210A, the Tax Manager reads the pertinent regulation. In step 210B, the system picks out the relevant passages from the pertinent regulations using, for example, natural language processing and/or natural language understanding. In step 212A, the Tax manager reads the memorandum set forth in Table 2. In step 212B, the system compares the language from the judgment entered by the Tax manager in step 204B (typed into the dialog box is a non-limiting example of data entry) with the language the system selected from section 162, regulation 1.162-1, and regulation 1.162-7. The system determines (for example, based on the high percentage of words that exist both in the language from the Judgment and the language from the sentences or phrases in the Code and regulations identified by the computer software as relevant) that section 162 and regulations 1.162-1 and 1.162-7 are the most likely legal authorities applicable to the question presented. The system then applies the decision-making techniques of Boolean Algebra/predicate logic outlined below in the section below entitled Exemplary Use of Boolean Algebra to conclude that the best answer to the question posed to it is that the payments required by the Judgment are deductible under section 162 and regulation 1.162-1 and 1.162-7.

In step 214A, the Tax Manager notes pertinent facts about the characterization of the payments. In step 214B, the system communicates with the Tax Manager (opening a new window is a non-limiting example of a suitable user interface technique). The system outputs a brief summarizing the issue it has investigated, the relevant facts, the governing law, and the conclusion. In step 216A, the Tax Manager reaches a conclusion based on the facts and the governing law, leading to resolution of the issue in step 218A. In step 216B, the Tax Manager reads the response (including the conclusion to the question presented) provided by the computer software, accepts it, and proceeds to the next issue, leading to resolution of the issue in step 218B. As indicated, one or more embodiments of the invention differ from current tax research techniques wherein existing "tax research" software merely produces in response to key words furnished by the user a list of authorities that contain words that match entered search terms. Current tax research techniques thus require the human being to personally read all of the authorities retrieved for him by the tax research software and decide which of them apply and what the likely tax result would be as a result of applying those authorities to the particular set of facts. In contrast, one or more embodiments not only identify the controlling authorities under the tax law but also provide a recommendation as to the proper resolution of the ultimate legal question (here, "are the payments deductible"), based on the application of Boolean Algebra/Predicate Logic.

In one or more embodiments of the invention, the Tax Manager need not use his computer continuously to look up tax authorities in a commercial tax research software maintained by a third party on a server. Indeed, in one or more embodiments, the exemplary system accesses tax law databases only a single time and reaches a conclusion about the most likely tax result much more quickly, and with less computer CPU time and/or less network bandwidth being used, as compared to current techniques.

Step 220 involves identifying the second issue, namely, when (i.e., in what accounting period) the payments required to be made under the judgment will be deductible by Company XYZ. By way of background, most companies and other business organization record events and transactions monthly in their books and records and summarize for their shareholders every 3 months (i.e. "quarterly" in accounting parlance) the financial results of their operations. The decision as to which "accounting period" the payments required by the judgment belong and should be recorded in therefore refers to the period (i.e. month) in which the payment belongs under U.S. GAAP. The steps followed in the approach using current techniques are set forth at steps 222A through 244A. The corresponding steps carried out by an exemplary embodiment of the system are left blank for brevity at steps 222B through 244B; however, an approach analogous to that followed in steps 202B-218B is followed in inputting pertinent search terms and/or portions of the judgment, locating the governing portions of the law and regulations, and applying the law to the facts based on simple word count or more sophisticated natural language processing and/or natural language understanding techniques along the lines described above. In step 246A, the Tax Manager concludes that $850,000 is deductible by Company XYZ in its 2015 tax year and $150,000 will be deductible in 2017 assuming it is paid in 2017. In step 246B, the system provides a recommendation to the Tax Manager that $850,000 is deductible by Company XYZ in its 2015 tax year and $150,000 will be deductible in 2017 assuming it is paid in 2017. The Tax Manager accepts this recommendation.

Step 248 involves identifying the third issue, namely, in what financial statement reporting period are the tax consequences of the Judgment to be recorded on the company's books? The steps followed in the approach using current techniques are set forth at steps 250A through 254A. The corresponding steps carried out by an exemplary embodiment of the system are left blank for brevity at steps 250B through 254B; however, an analogous approach steps 202B-218B is followed in; inputting pertinent search terms and/or portions of the judgment, locating the governing portions of the law and regulations, and applying the law to the facts based on simple word count or more sophisticated natural language processing and/or natural language understanding techniques. Note, however, that in resolving this third issue the system looks for governing authority in the accounting standards database rather than the Federal tax database. In step 256A, the Tax Manager concludes that Company XYZ must record in its financial statements for the month ending Sep. 30, 2015 the full amount of the tax consequences of the Judgment. In step 256B, the system provides a recommendation to the Tax Manager that Company XYZ must record in its financial statements for the month ending Sep. 30, 2015 the full amount of the tax consequences of the Judgment. The Tax Manager accepts this recommendation.

Step 258 involves identifying the fourth issue, namely, "what are the entries to be made in the company's books for the month ending Sep. 30, 2015 to record the tax effects of the Judgment?". The steps followed in the approach using current techniques are set forth at steps 260A through 264A. Aspects of the corresponding steps carried out by an exemplary embodiment of the system are presented at 260B through 264B. In general, an approach analogous to that followed in steps 202B-218B is used by the exemplary embodiment in carrying out steps 260B through 264B; inputting pertinent search terms and/or portions of the judgment, locating the governing portions of the law and regulations, and applying the law to the facts based on simple word count or more sophisticated natural language processing and/or natural language understanding techniques. Note, however, that in step 260B the system looks for governing authority in the accounting standards database rather than the Federal tax database, while in step 262B the system looks for governing authority in the California state tax database and the Federal tax rate tables. In step 264A, the Tax Manager determines that the entries 266A-282A should be recorded in the books and records of Company XYZ during September, 2015. In step 264B, the system develops and posts to Company XYZ's general ledger system the entries 266B-282B during September, 2015, after sending a notification Tax Manager's smart phone or similar device that the system has completed its analysis and posted the journal entry. As discussed below with regard to step 520 and elements 395 and 397, some embodiments send a notification to the user's smart phone or similar device telling the user the system has completed its analysis and created (and posted to Company XYZ's general ledger) the tax journal entry.

In step 284A, the Manager, Tax Accounting uses his computer to enter into Company XYZ's general ledger accounting system the entries 266A-282A. In step 284B, the exemplary system sends an email to the Tax Manager with the indicated summary of the work it performed (or conveys this information to the Tax Manager via a suitable user interface or other technique). Either the system can record the tax entry directly to the company's general ledger accounting system or it can provide the entry to the Tax Manager and allow the Tax Manager to record the entry in the company's general ledger accounting system.

Thus, in the exemplary embodiment, the following questions have been resolved:
1. Are payments required by the Judgment deductible?
2. If answer to #1 is "yes", when are they deductible?
3. When (in what financial statement reporting period) are the tax consequences of the Judgment to be recorded on the company's books?
4. What is the actual entry to be made to record the tax consequences of the Judgment on the company's books?

As noted in FIG. 2, one or more embodiments of the invention provide a method of automatically creating a financial journal entry, in accordance with U.S. GAAP, to record an economic transaction of a taxable entity. The method includes receiving input data relating to the economic transaction from a source (e.g. a human being, a network connection, or the like). The input data represents economic events associated with the economic transaction. The input data includes a transaction entry date, a tax amount, a time period to which the tax amount applies, and a payment date on which the tax amount is to be paid to a tax authority. A further step includes using a data processing system programmed to apply rules based on GAAP to the input data. A still further step includes causing the data processing system to generate a journal entry that represents the economic transaction.

In some instances, the data processing system includes a memory; at least one processor coupled to the memory; a persistent storage device accessible to the at least one processor, which includes a lookup database storage that defines journal entries for a plurality of input data corresponding to a plurality of economic transactions; and a logic engine module operable to apply logic based on GAAP to define journal entries which remain undefined by the lookup database storage. The logic engine module may be implemented by instructions stored in a non-transitory medium, such as the persistent storage, which, when loaded into the memory, appropriately configure the at least one processor.

Some embodiments employ computer search functionality to pull information from data sources and then determine the frequency of occurrence of keywords in the facts presented to the computer. This information is in turn used to identify the most likely sections of tax law and accounting guidance that apply to answer the question presented. Some embodiments apply Boolean logic to the accounting and tax law analysis, providing a specific application of the general principle of Boolean logic/algebra and reasoning. For example, some embodiments utilize Boolean Logic/Algebra concepts to reason to the "right" answer to the question—e.g., using Boolean algebra, logic and reasoning rules to determining the amount of tax to be recorded on a business's books and/or to determine the answer to a legal question under tax law for purposes other than the recordation of actual transactions in a business's books, such as to determine the most likely answer to a tax law question so that the person who asks the question can get "advice" from the method as to the likely result under tax law.

One or more embodiments employ machine-implemented Boolean algebra to determine what tax-related items of income, expense, assets and liabilities should be recorded in a business's books and records for transactions that have already been completed, and/or to determine what the most likely tax answer is to a set of facts about a transaction or event that has not yet occurred so that the person considering entering into that transaction or event can make an informed decision about the likely tax outcome of that transaction. Use of Boolean Logic and Algebra and/or other disclosed techniques helps to determine the "most accurate" answer to a tax or accounting question, thus reducing the amount of other computer research time and physical tools such as calculators, books, portable computers, etc. as may be required to resolve such issues using conventional approaches.

Note that in FIG. 1B, actions described within dotted-line boxes are actions taken by the person to whom that action is assigned. It should be noted that one or more embodiments differ from tax preparation software such as TurboTax and Corptax in that those software packages require the person entering financial data into the program to make the decision about the proper tax law and, if applicable, the U.S. GAAP accounting consequences of the transaction represented by the data. Those programs do not use symbolic logic, Boolean Algebra, or similar decision-making techniques as disclosed herein to determine the correct tax law and GAAP treatment to apply to that data. In contrast to software such as TurboTax and Corptax, one or more embodiments of the invention employ symbolic logic, Boolean Algebra, and/or other techniques disclosed herein to determine the correct GAAP accounting treatment for the data. Furthermore, the level of explanation provided by the personnel using current techniques is unlikely in practice to be as robust as the level of explanation provided by one or more embodiments, as the human will typically provide a much more limited explanation for which the public accounting firm that reviews the company's books and records will have to ask as to the reasons.

Figure 3:
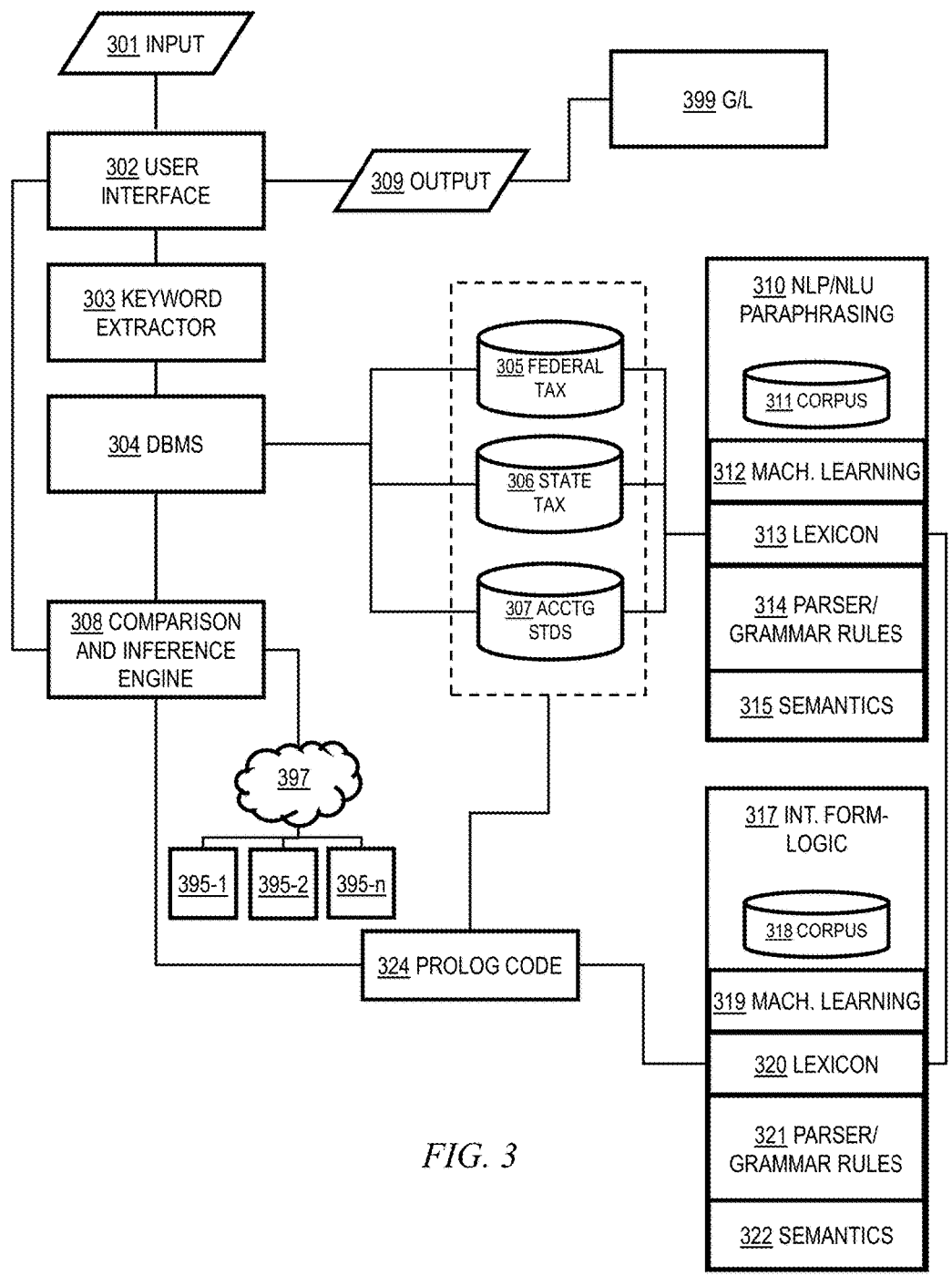
FIG. 3 shows a system block diagram, including exemplary software architecture, in accordance with an aspect of the invention.

FIG. 3 shows exemplary software architecture, in accordance with an aspect of the invention. User interface 302 obtains input 301 from a user. This can include specific keywords or selection from a menu contained in a drop-down box as described in step 202B of FIG. 2 as well as selection of state tax, federal tax, GAAP, etc. See also step 204B entry of judgment prose. In some instances, a keyword extractor 303 is included to extract pertinent keywords from prose. This can be as simple as discarding stop words to more sophisticated text processing techniques to parse the input and identify the concepts using natural language understanding and/or natural language processing (NLU and or NLP). Database management system (DBMS) 304 then queries the appropriate database 305, 306, or 307 to find pertinent entries. For example, if a federal tax question is specified in the input, database 305 is queried; if a state tax question is specified in the input, database 306 is queried; and if a GAAP question is specified in the input, database 307 is queried. The tax databases can include, for example, the pertinent codes, regulations, and tax rates. The DBMS can be a simple relational DBMS or can have more sophisticated text search capability or even be a graph database. Comparison and inference engine 308 applies the identified authority to the facts at hand to reach a recommended conclusion, based on simple word count, Boolean algebra, symbolic logic, or natural language understanding and/or natural language processing, as described more fully in the section below entitled Exemplary Use of Boolean Algebra. User interface 302 also provides the recommended conclusion as output 309 to a user.

Example 1—Exemplary Use of Boolean Algebra

Exemplary Boolean algebra additions are provided in narrative form rather than in symbolic form; however, they could also be stated in the "P includes Q therefore all Q is P" type format. Additional concepts such as "the greater includes the lesser" can also be included—e.g., "compensation" includes "cash compensation" and "non-cash compensation" because under the logical principle that "the greater includes the lesser" the addition of the adjective "cash" as a modifier to the word "compensation" limits the meaning of the phrase "cash compensation" to a portion of the scope of meaning of the word "compensation" by excluding from the meaning of "cash compensation" all compensation other than cash. This can be expressed in Boolean algebra as "A includes B but B does not include A" or the like.

In step 204B, consider a symbolic logic Proposition (Item #1 in Table 4—Logic Table below). In step 206B, consider a symbolic logic Proposition (Item #2 in Table 4-Logic Table below). In step 208B, consider a symbolic logic Proposition (Item #3 in Table 4—Logic Table below). After step 212B, the system identifies additional questions to which answers are required from the Tax Manager before a conclusion can be given and poses these questions to the Tax Manager in a window on his computer screen (Item #4 in Table 4—Logic Table below). The computer software applies the deductive reasoning rules of symbolic logic to reach the appropriate conclusion. Consider a symbolic logic Proposition (Item #3 in Table 4—Logic Table below). Regarding step 214B, consider application of deductive logic to reach a conclusion (Item #5 in Table 4-Logic Table below).

TABLE 4

SYMBOLIC LOGIC TABLE

Item #1

The following propositions are contained in the language of the judgment typed (or otherwise entered) into the computer by the Tax Manager that "The Court finds that John Q. Acme is entitled to recover from Company XYZ the sum of $1,000,000 as compensation for personal services provided by him to Company XYZ, of which $850,000 is payable within 10 days of the date of this order and of which $150,000 is payable when Company XYZ collects from its customers the $1,500,000 in fees for which John Q. Acme is entitled to be paid a 10% commission" and "Date of this order is Sep. 5, 2015":
• John Q. Acme is entitled to recover the sum of $1,000,000 (computer assigns this "A")
• Company XYZ is obligated to pay John Q. Acme the sum of $1,000,000 (Note: the computer system uses general rules of natural language to convert the phrase "John Q. Acme is entitled to recover from Company XYZ the sum of $1,000,000" into two separate propositions: (a) that John Q. Acme is entitled to recover $1,000,000 and that Company XYZ is required to pay
John Q. Acme the sum of $1,000,000.) (computer assigns this "B")
• $850,000 of the $1,000,000 is payable within 10 days of the date of the order (Note: the computer uses natural language and rules of grammar stored in its database to convert the phrase "of which $850,000 is payable within 10 days of the date of this order" into the proposition "$850,000 of the $1,000,000 is payable within 10 days of the date of the order.) (computer assigns this "C")
• The date of the order is Sep. 5, 2015 (computer assigns this "D")
• $150,000 of the $1,000,000 is payable 30 days after Company XYZ collects from its customers the $1,500,000 in fees for which John Q. Acme
is entitled to be paid a 10% commission. (Note: the computer uses natural TABLE 4-continued

SYMBOLIC LOGIC TABLE language and rules of grammar stored in its database to convert the phrase "of which $150,000 is payable 30 days after Company XYZ collects from its customers the $1,500,000 in fees for which John Q. Acme is entitled to be paid a 10% commission" into the proposition "$150,000 of the $1,000,000 is payable 30 days after Company XYZ collects from its customers the $1,500,000 in fees for which John Q. Acme is entitled to be paid a 10% commission.) (computer assigns this "E")
Item #2

The following propositions are contained in the language of Code Section 162 stating that a taxpayer is "allowed as a deduction all the ordinary and necessary expenses paid or incurred during the taxable year in carrying on any trade or business, including — (1) a reasonable allowance for salaries or other compensation for personal services actually rendered;"
• all the ordinary and necessary expenses paid or incurred during the taxable year in carrying on any trade or business are allowed as a deduction (computer assigns this "F")
• a reasonable allowance for salaries or other compensation for personal services actually rendered are ordinary and necessary expenses paid or incurred during the taxable year in carrying on any trade or business (computer assigns this "G")
Item #3

The following propositions are contained in the statement found by the computer in the language in 1.162-1(a) that reads as follows: "Business
expenses deductible from gross income include the ordinary and necessary expenditures directly connected with or pertaining to the taxpayer's trade or business, except items which are used as the basis for a deduction or a lcredit under provisions of aw other than section 162."
• Business expenses are deductible from gross income (computer assigns this "H")
• Ordinary and necessary expenditures directly connected with or pertaining to the taxpayer's trade or business are business expenses deductible from gross income (computer assigns this "I")
• Items used as the basis for a deduction or a credit under provisions of law other than section 162 are not deductible from gross income (computer assigns this "J")
Item #4 Missing Propositions The computer identifies the following propositions that are missing from the information supplied to it by the tax manager and by its databases that are required for it to answer the question put to it by the tax manager. The computer system presents these questions to the tax manager in a window on the manager's computer screen:
1. Is company XYZ in a trade or business? Y/N Tax Manager's answer: Y (computer assigns this "K")
2. Is the $850,000 of compensation payable to John Q. Acme within 10 days of the order reasonable? Y/N Tax Manager's answer: Y (computer assigns this "L")
3. Is the $850,000 of compensation to John Q. Acme payable 30 days after
Company XYZ collects from its customers the $1,500,000 in fees for which John Q. Acme is entitled to be paid a 10% commission reasonable? Y/N Tax Manager's answer: Y (computer assigns this "M")
4. Is the $1,000,000 payable to John Q. Acme used as the basis for a deduction or a credit under provisions of law other than section 162? Y/N Tax Manager's answer: N (computer assigns this "N")
5. In which taxable year were the services for which compensation of $850,000 payable to John Q. Acme actually rendered? Tax Manager's answer: 2013 (computer assigns this "O")
6. In which taxable year were the services for which compensation of $150,000 payable to John Q. Acme actually rendered? Tax Manager's answer: 2013 (computer assigns this "P")
7. In which taxable year was the $850,000 payable to John Q. Acme paid or incurred? Tax Manager's answer: 2015 (computer assigns this "Q")
8. In which taxable year was $150,000 payable to John Q. Acme paid or incurred? Tax Manager's answer: 2017 (computer assigns this "R")
Item #5

Computer applies Boolean algebra logical expressions to the items to which it assigned letters A through R to reach the following conclusions:
Issue #1: Deductibility of the $1,000,000
1. The $1,000,000 is payable by Company XYZ to John Q. Acme.
2. The $1,000,000 is compensation for personal services.
3. The $1,000,000 is deductible by XYZ during 2015 as a reasonable allowance for salaries or other compensation for personal services actually TABLE 4-continued

SYMBOLIC LOGIC TABLE rendered which are ordinary and necessary expenses paid or incurred in carrying on any trade or business.
Issue #2: In what year is the $1,000,000 is deductible
4. $850,000 of the $1,000,000 is payable within 10 days of Sep. 5,2015.
5. $150,000 of the $1,000,000 is payable during 2017.
6. The $850,000 is deductible by XYZ during 2015 as a reasonable allowance for salaries or other compensation for personal services actually rendered which are ordinary and necessary expenses paid or incurred during 2015 in carrying on any trade or business.
7. The $150,000 is deductible during 2017 as a reasonable allowance for salaries or other compensation for personal services actually rendered which are ordinary and necessary expenses paid or incurred during 2015 in carrying on any trade or business.

Example 2—Application of Symbolic Logic to Tax Accounting Example

Overview of Symbolic Logic

Most of our day-to-day reasoning is expressed using sentences of a natural language such as English. Unfortunately, natural languages include many expressions that are vague, ambiguous, or in other ways unclear. This lack of clarity can lead to errors in reasoning. In an effort to develop more effective methods of reasoning, mathematicians in the nineteenth century began developing artificial languages that expressed logical relations more clearly. Modern symbolic logic represents the culmination of their efforts.

Modern symbolic logic comprises the most powerful methods developed to date for testing logical coherence, logical implication, and equivalence. Those methods originated with the work of mathematicians such as George Boole. (What we today call 'Boolean algebra' comprised a set of formal techniques that took True and False (or 1 and 0) as the values of its variables.) Subsequent work led to the development of sentential logic (also known as propositional or zero-order logic) as well as predicate logic (also known as first-order logic). Both involve the construction of artificial languages of symbols which can be used to represent expressions of ordinary English. Because expressions of the artificial languages are constructed according to very precise rules, they are able to represent the logical relations among ordinary English expressions more perspicuously than English itself allows. As a result, the artificial languages provide a powerful tool for evaluating (and if needs be, correcting) reasoning in ordinary English.

It is possible to symbolize sections of the Internal Revenue Code and its accompanying regulations using a first-order language such as PLE (short for 'Predicate Logic Extended') which is developed in *The Logic Book, Sixth Edition*, by Merrie Bergmann, James Moor, and Jack Nelson (McGraw-Hill 2014), expressly incorporated herein by reference in its entirety for all purposes. It is also possible to use the derivation system PDE (short for 'Predicate Derivation Extended') described in *The Logic Book* to draw conclusions about how the Internal Revenue Code and its accompanying regulations apply to specific cases.

The formal syntax of PLE includes the following symbols:
  Sentence letters: The capital Roman letters 'A' through 'Z' with or without numerical subscripts as in 'T', '$A_1$', or '$F_{22}$'.
  Truth-functional connectives: ~, &, ∨, ⊃, ≡
  Punctuation marks: ( )

The foregoing symbols by themselves constitute the apparatus of a sentential logic which is able to represent simple inferences in ordinary English. The sentence letters of PLE can be used to represent sentences in English such as 'Sally dances salsa' and 'Betty dances swing'. The truth-functional connectives allow representation of more complex sentences such as 'If Sally dances salsa, then Betty dances swing' or 'Either Betty dances swing or Sally doesn't dance salsa'. Expressions such as 'if . . . then . . . ' and 'either . . . or . . . ' are called truth-functional connectives because the truth or falsity of the sentences that result from applying them is determined completely by the truth or falsity of the sentences they are applied to. For instance, the truth or falsity of the sentence 'Sally doesn't dance salsa' is determined completely by the truth or falsity of the sentence 'Sally dances salsa'. If the latter sentence is true, then former sentence is false, and if the latter sentence is false, then the former sentence is true.

The truth-functions of PLE can be defined using truth tables such as following:

| P | ~P |
|---|----|
| T | F  |
| F | T  |

This table shows that when the sentence P is true, the sentence ~P is false, and that when the sentence P is false, the sentence ~P is true. The truth tables defining the other truth-functional connectives of PLE are as follows:

| P | Q | P & Q |
|---|---|-------|
| T | T | T |
| T | F | F |
| F | T | F |
| F | F | F |

| P | Q | P ∨ Q |
|---|---|-------|
| T | T | T |
| T | F | T |
| F | T | T |
| F | F | F |

| P | Q | P ⊃ Q |
|---|---|-------|
| T | T | T |
| T | F | F |
| F | T | T |
| F | F | T |

| P | Q | P ≡ Q |
|---|---|-------|
| T | T | T |
| T | F | F |
| F | T | F |
| F | F | T |

Parentheses are used as grouping symbols in PLE much as they are in arithmetic. There is, for instance, a difference between the sentence '(P & Q) ⊃ R' and the sentence 'P & (Q ⊃ R)'. Even though the sentence symbols P, Q, and R and the connectives & and ⊃ are the same in both, the sentences will have different truth values on some interpretations because of the grouping symbols. For instance, if P, Q, and R are all false, then the first sentence is true, but the second sentence is false.

In addition to an apparatus for representing sentences in a natural language a system of sentential logic is also equipped with a set of derivation rules such as the Conditional Elimination rule ($\supset$E):

P$\supset$Q
P
∴Q $\supset$E

This indicates that when there are sentences of the form P$\supset$Q and P, the sentence following the ∴ (therefore) symbol can be derived, namely Q. The derivation rules of PLE are valid or truth-preserving; that is, they are guaranteed to yield true sentences provided that the initial sentences are true. For instance, if it is really true that Sally dances only if Betty does, and it's also true that Sally dances, then it must also be true that Betty does. Because the derivation rules for PLE are all valid, a false result cannot be arrived at if the sentences started with are true. Because of this, a language like PLE provides a powerful tool for evaluating reasoning in a natural language like English.

Many inferences in ordinary English cannot be represented using the foregoing symbols of sentential logic alone. To illustrate the limitations of sentential logic consider the following inference, which is valid in English (that is, if the premises are true, the conclusion cannot be false):

1. All men are mortal
2. Socrates is a man
Therefore, Socrates is mortal.

In sentential logic this is represented as follows:

1. M
2. S
∴D (Invalid)

Because the logical relations among the sentences of this inference are not expressed by a mere sentence letter, the inference appears invalid. To capture those relations the more sophisticated logical apparatus of a first-order language like PLE is advantageously employed in one or more embodiments. That logical apparatus comprises the following symbols in addition to those already mentioned:

Predicates: The capital Roman letters 'A' through 'Z' with or without numerical subscripts and followed by primes as in 'M', '$F_1$'', or '$G_{15}$'''.

Individual constants: Lowercase Roman letters 'a' through 'v' with or without numerical subscripts.

Individual variables: Lowercase Roman letters 'w' through 'z' with or without numerical subscripts.

Quantifier symbols: $\forall$, $\exists$

The two place identity predicate: =(Note that the formal semantics of the identity predicate are very complicated. Its details are discussed in Chapter 8 of *The Logic Book*. If a=b, then a is the same individual as b. Consequently, if a=b, then whatever is true of a is also true of b and vice versa. If, for instance, it is true that a is F, then it must also be true that b is F since a and b are the same individual. Moreover, every individual is the same as itself, so it is true of every individual, x, that x=x.

Functors: Lowercase italicized Roman letters with or without numerical subscripts: a, b, c, . . .

Other individual terms of PLE: Expressions of the form $f(t_1, t_2, \ldots, t_n)$, where $f$ is an n-place functor and $t_1, t_2, \ldots, t_n$ are individual constants, variables, or other individual terms of PLE.

Included here are symbols that express quantifiers such as 'all', 'some', and 'none'. Quantifier symbols allow the representation of the validity of the foregoing inference. To appreciate this, begin with a symbolization key which indicates how the symbols of PLE are to be interpreted in this particular case. The symbolization key includes a universe of discourse (UD) which is a nonempty set that includes all the things being referred to in this particular application of PLE; here, all the things that are men—the following interpretations are being assigned to the predicate symbols 'M' and 'T' and to the individual constant 's':

UD: {men}
Mx: x is a man
Tx: x is mortal
s: Socrates

Given this interpretation of the symbols of PLE, the validity of the foregoing inference can be represented by applying the valid derivation rules $\forall\exists$ (Universal Elimination) and $\supset$E (Conditional Elimination) to the initial assumptions:

| | |
|---|---|
| 1. ($\forall$x)(Mx $\supset$ Tx) | Assumption |
| 2. Ms | Assumption |
| 3. Ms $\supset$ Ts | 1 $\forall$E |
| 4. Ts | 3,4 $\supset$ E |

The discussion that follows illustrates how sentences of the Internal Revenue Code and its accompanying regulations can be represented in the language PLE. First, however, consider the syntax of PLE—that is, the precise rules that define what counts as a sentence of PLE. Initially, define a formula of PLE. Which combinations of symbols qualify as formulas of PLE can be stated with the help of the following definitions. Note that the boldface letters are metavariables ranging over expressions of PLE. A metavariable is a symbol that belongs to a metalanguage and that stands for expressions in an object language. A metalanguage is a language used to discuss or examine some other language, the object language. Here PLE is the object language, and English is the metalanguage. The boldface symbols 'x', 'n', 'P', and 'Q' are the metavariables used to represent expressions of PLE.

Quantifier: An expression of PLE of the form ($\forall$x) or ($\exists$x).
Atomic formulas: Every expression of PLE that is either a sentence letter of the language or an n-place predicate of PLE followed by n individual terms.

It is now possible to define the formulas of PLE recursively:

1. Every atomic formula of PLE is a formula of PLE.
2. If P is a formula of PLE, so is ~P.
3. If P and Q are formulas of PLE, so are (P & Q), (P$\lor$Q), (P$\supset$Q), and (P≡Q).
4. If P is a formula of PLE that contains at least one occurrence of x and no x-quantifier, then ($\forall$x)P and ($\exists$x)P are both formulas of PLE.
5. Nothing is a formula of PLE unless it can be formed by repeated applications of these clauses 1-5.

Finally, a sentence of PLE can be defined as follows:
Sentence: A formula P of PLE is a sentence of PLE if and only if every occurrence of a variable x in P is within the scope of an x-quantifier, where the scope of a quantifier includes the quantifier itself and the sub-formula that immediately follows it.

Now, with a clear definition of what counts as a sentence of PLE, PLE can be used to represent sections of the Internal Revenue Code. In each case, a sentence of the Code is paraphrased to bring out more clearly the logical relations among its clauses. That is to say, in one or more embodiments, the computer is programmed to paraphrase sentences of the Internal Revenue Code and Regulations into sentences that can be rendered in a formal language like PLE. The paraphrase is then symbolized in PLE using a symbolization key. Note that to enhance the readability of sentences of PLE, three informal conventions are adopted herein: (1) omitting the primes on predicates when the context makes it clear whether the predicate is a one-place, two-place, . . . or n-place; (2) dropping the outermost parentheses of sentences of PLE; and (3) occasionally using square brackets [ ] in place of parentheses.

Because a formal language like PLE is designed to guarantee accurate conclusions given accurate assumptions, its application to authoritative tax, accounting, and legal guidelines as set forth herein provides a methodology for determining the proper conclusion to be drawn when those authoritative guidelines are applied to specific questions or sets of facts.

Non-Limiting Example of Application of Symbolic Logic
   i: Application of Predicate Logic to Tax Law
     iA: Application to Internal Revenue Code 162 (a)(1)

In one or more embodiments, the "original sentence" set forth below is converted into the following "paraphrase" sentence. The paraphrase can be performed using a variety of techniques as discussed elsewhere herein; for example: (a) by the computer using existing natural language software that has been modified to apply rules of syntax determined by courts to be applicable to the interpretation of the meaning of statutes, judicial, and regulatory authorities; (b) by human subject matter expert—e.g., a person who has mastered the rules of predicate logic taught in a standard undergraduate introductory logic course at a four-year college or university; or the like. In the embodiment in which the computer uses natural language software to create the paraphrase, the computer uses the rules of grammar and meanings of words contained in its database of dictionaries, grammatical rules, and rules of writing style published by reputable institutions and acknowledged as authoritative by U.S. courts in analyzing the meanings of words in U.S. tax statutes, regulations, and other documents included in its database as authoritative guidance on tax, legal, and accounting issues. In doing so the computer uses its database to identify words as adjectives, adverbs, nouns, etc., determine which words in a sentence modify the meaning of other words, and determine how the words in the sentence, and the sentence as a whole, are to be interpreted.

In some instances, the computer looks for specific words entered into the system by the Tax Manager or contained in its database of tax and accounting rules and regulations. If the words entered by the Tax Manager do not match the words contained in the computer's database of tax and accounting rules the computer examines its database of dictionaries (both in general, e.g. Merriam-Webster, and specific, as in dictionaries of terms that are ascribed particular meaning in the tax and accounting areas) to determine the meanings of those words. The computer also uses the rules in its database concerning sentence construction to determine when, using standard English, a portion of a sentence is treated as either broadening the scope of words contained elsewhere in the sentence (as would be the case when a phrase in a sentence is preceded by the word "including" as is the case with code section 162) or limiting the scope of the words contained elsewhere in the sentence.

The "paraphrase" sentence accurately reflects the logical meaning of the original sentence. In one or more embodiments, a computer program applies the meaning of the paraphrased sentence to data typed into the computer by the user of the computer.

Original sentence: "There shall be allowed as a deduction all the ordinary and necessary expenses paid or incurred during the taxable year in carrying on any trade or business, including a reasonable allowance for salaries or other compensation for personal services actually rendered" (Code Section 162(a)(1)).

Paraphrase: If y is a trade or business and x is an ordinary or necessary expense paid or incurred during the taxable year in carrying out that trade or business, then x is a deduction. In addition, if z is a reasonable allowance for salaries or other compensation for personal services actually rendered in carrying on that business or trade, then z is an ordinary or necessary expense paid or incurred during the taxable year in carrying out that trade or business.

This can be symbolized in PLE as follows:

$$(\forall x)(\forall y)[[((Ty \lor By)\&(Oxy \lor Nxy)) \supset Dx]\&(\forall z)[Rzy \supset (Ozy \lor Nzy)]]$$

where the symbols are assigned the following interpretations:
UD: {agents, activities, dollar amounts}
Cx: x carries on a business
Xx: x carries on a trade
Nxy: x is a necessary expense paid or incurred during the taxable year in carrying on y
Oxy: x is an ordinary expense paid or incurred during the taxable year in carrying on y
Tx: x is a trade
Bx: x is a business
Rxy: x is a reasonable allowance for salaries or other compensation for personal services actually rendered in carrying on y
Dx: x is a deduction
b(x): x's business
t(x): x's trade
a: John Q. Acme
n: $100,000 iA-1: Application to Regulation Section 1.162-1(a)
    Original sentence: "Business expenses deductible from gross income include the ordinary and necessary expenditures directly connected with or pertaining to the taxpayer's trade or business, except items which are used as the basis for a deduction or a credit under provisions of law other than section 162" (Regulation Section 1.162-1(a))

Paraphrase: If someone, x, is a taxpayer, and y is an ordinary or necessary expenditure directly connected with or pertaining to x's trade, or an ordinary or necessary expenditure directly connected with or pertaining to x's business, and y is not used as the basis for a deduction or a credit under provisions of law other than section 162, then y is deductible from gross income.

This can be symbolized in PLE as follows:

$$(\forall x)(\forall y)[[Yx\&[((O_2yt(x) \lor N_2yt(x)) \lor (O_2yb(x) \lor N_2yb(x)))\&\sim C_2y]] \supset D_2yg(x)]$$

The symbols are assigned the following interpretations:
UD: {agents, activities, dollar amounts}
$C_2x$: x is used as the basis for a deduction or credit under provisions of the law other than section 162
Yx: x is a taxpayer
$D_2xy$: x is deductible from y
$N_2xy$: x is a necessary expenditure directly connected with or pertaining to y
$O_2xy$: x is an ordinary expenditure directly connected with or pertaining to y
b(x): x's business
g(x): x's gross income
t(x): x's trade In addition to this principle from the Code, there are certain background assumptions implicitly involved in applying it to specific cases. These can be stated and symbolized as follows:

x carries on a business if and only if x's business is a business: $(\forall x)(Cx \equiv Bb(x))$ x carries on a trade if and only if x's trade is a trade: $(\forall x)(Xx \equiv Tt(x))$ The following is a non-limiting example of how the foregoing items would apply to a specific case. Suppose that John Q. Acme carries on a business, and that he paid $100,000 for salaries or other compensation during the taxable year in carrying on his business. Suppose, moreover, that this is a reasonable allowance for salaries and other compensation for the services that were actually rendered in carrying on his business. These circumstances can be symbolized together with the section of the Code and the implicit background assumptions in PLE as follows:

| | |
|---|---|
| 1. $(\forall x)(\forall y)[[((Ty \lor By) \& (Oxy \lor Nxy)) \supset Dx] \&$ $(\forall z)[Rzy \supset (Ozy \lor Nzy)]]$ | Assumption |
| 2. $(\forall x)(Cx \equiv Bb(x))$ | Assumption |
| 3. $(\forall x)(Xx \equiv Tt(x))$ | Assumption |
| 4. Ca | Assumption |
| 5. Rnb(a) | Assumption |

A natural language version of each of these symbolic assumptions is presented by the computer to the user together with a prompt for the user to identify the assumptions as true or false. From these claims, and if the user confirms that each of the assumptions is true, it is possible to derive the conclusions stated below using the derivation system PDE from *The Logic Book, Sixth Edition*. PDE comprises a set of valid rules (and only valid rules) for deriving sentences of PLE from other sentences of PLE. The system is sound; that is, if the original sentences are true, then the derived sentences are guaranteed to be true (the soundness of PDE is proven in Chapter 11 of *The Logic Book: Sixth Edition*). In this case, if Assumptions 1-5 are true, then the following conclusions are guaranteed to be true as well. In each case, the sentence of PLE is derived from the Assumptions using the derivation rule listed in the right-hand column. In line 6, for instance, the sentence 'Ca≡Bb(a)' is derived from lines 2 using the Universal Elimination rule ∀E. Similarly, the sentence 'Bb(a)' in line 7 is derived from lines 4 and 6 using the Biconditional Elimination rule ≡E.

| | |
|---|---|
| 6. $Ca \equiv Bb(a)$ | 2 ∀E |
| 7. Bb(a) | 4,6 ≡E |
| 8. $Tb(a) \lor Bb(a)$ | 7 ∨I |
| 9. $(\forall y)[[((Ty \lor By) \& (Ony \lor Nny)) \supset Dn] \&$ $(\forall z)[Rzy \supset (Ozy \lor Nzy)]]$ | 1 ∀E |
| 10. $[((Tb(a) \lor Bb(a)) \& (Onb(a) \lor Nnb(a))) \supset Dn] \&$ $(\forall z)+Rzb(a) \supset (Ozb(a) \lor Nzb(a))]$ | 9 ∀E |
| 11. $((Tb(a) \lor Bb(a)) \& (Onb(a) \lor Nnb(a))) \supset Dn$ | 10 &E |
| 12. $(\forall z)[Rzb(a) \supset (Ozb(a) \lor Nzb(a))]$ | 10 &E |
| 13. $Rnb(a) \supset (Onb(a) \lor Nnb(a))$ | 12 ∀E |
| 14. $Onb(a) \lor Nnb(a)$ | 5,13 ⊃E |
| 15. $(Tb(a) \lor Bb(a)) \& (Onb(a) \lor Nnb(a))$ | 8,14 &I |
| 16. Dn | 11,15 ⊃E |

Consequently, using the rules of the derivation system PDE, the conclusion is derived that $100,000 is deductible.

Occasionally the computer is given insufficient information by the user to answer the question put to it. When this happens the computer makes assumptions as to the answers to the missing information and presents to the user a series of questions in a window on the manager's computer screen to which the user answers yes or no. "Yes" answers are treated by the computer as confirmation that the assumptions made by the computer are correct, or true; "no" answers are treated by the computer as meaning that the assumptions made by the computer are incorrect, or false. By answering these questions the user supplies the computer with the additional information it needs to derive an answer.

iB: Application to Treasury Regulation Section 1.162-7(a)

Original sentence: "There may be included among the ordinary and necessary expenses paid or incurred in carrying on any trade or business a reasonable allowance for salaries or other compensation for personal services actually rendered" (Regulation Section 1.162-7(a))

Paraphrase: If x is a reasonable allowance for salaries or other compensation for personal services actually rendered, then there is a y such that y is a business or trade, and x is an ordinary or necessary expense paid or incurred during the taxable year in carrying out y.

This can be symbolized in PLE as follows:

$$(\forall x)[Rx \supset (\exists y)((Ty \lor By) \& (Oxy \lor Nxy)]$$

The symbols are assigned the following interpretations:

UD: {agents, activities, dollar amounts}
Bx: x is a business
Rx: x is a reasonable allowance for salaries or other compensation for personal services actually rendered
Tx: x is a trade
Nxy: x is a necessary expense paid or incurred during the taxable year in carrying on y
Oxy: x is an ordinary expense paid or incurred during the taxable year in carrying on y
b(x): x's business
a: John Q. Acme
n: $100,000

The following is a non-limiting example applying the foregoing to a specific case. Suppose that John Q. Acme carries on a business, and that he paid $100,000 for salaries or other compensation during the taxable year in carrying on his business. Suppose, moreover, that this is a reasonable allowance for salaries and other compensation for the services that were actually rendered in exchange for them. These circumstances together with the symbolized section of the Code can be represented in PLE as follows:

1. $(\forall x)[Rx \supset (\exists y)((Ty \lor By) \& (Oxy \lor Nxy))]$ Assumption
2. Bb(a) Assumption
3. Rn Assumption From these claims, and assuming the user of the computer system confirms that each of the assumptions are true, the following conclusions can be derived using the rules of the derivation system PDE from *The Logic Book, Sixth Edition*:

4. $Rn \supset (\exists y)((Ty \lor By) \& (Ony \lor Nny))$ 1 ∀E
5. $(\exists y)((Ty \lor By) \& (Ony \lor Nny))$ 3,4 ⊃E Consequently, using the rules of the derivation system PDE it is possible to derive the conclusion that $100,000 counts as an ordinary or necessary expense paid or incurred in carrying on a trade or business.

ii. Application of Logical Rules Programmed into the Computer to Answer a Question Posed by the User ii.A: Background Consider an example where the Tax Manager used the "ask me a question" feature of the system to instruct the computer to analyze the deductibility (by selecting "deduction" from the drop-down menu) of "compensation" (also selected from the drop-down menu) under federal tax law (also by selecting "federal" using the drop-down menu) of the information provided to the computer when the language of the judgment was typed into the system. The computer uses these inputs from the Tax Manager to formulate the question "Is a deduction under federal tax law allowed for compensation?"

To answer the question posed by the Tax Manager, the computer first searches its database of federal tax authorities for words that match the words entered into the system by the Tax Manager (as described in steps 204B through 210B of the Accounting Process Flowchart—Example Involving a Tax Accounting Decision) and identifies Internal Revenue Code section 162 and Internal Revenue Code Regulation sections 1.162-1 and 1.162-7 as the most relevant sections of federal tax law.

The second step undertaken by the computer is to assign symbols to each of the statements entered by the Tax Manager, to each of the conditions for deductibility identified by the computer in its review of Internal Revenue Code section 162 and Internal Revenue Code Regulation sections 1.162-1 and 1.162-7, and to each of the answers provided by the Tax Manager to the questions posed to him by the computer.

The third step is for the computer to apply Symbolic Logic to the language of these code and regulation sections to determine the requirements that must be met for a compensation deduction to be available under those sections for the payment described in the language of the judgment entered into the computer by the Tax Manager.

The computer accepts that the sentences entered into it by human beings are true, both those programmed into its database and propositions entered into the system by the users of the system (e.g. the Tax Manager in this embodiment). In one or more embodiments, in the event of a conflict between the statements entered by a user of the system and the statements programmed into its database by the humans who programmed the computer, the computer accepts as correct the statements programmed into its database and notifies the human user that a conflict has arisen and that the computer is using the information contained in its database.

The Tax Manager types (or enters in some other suitable fashion, e.g. speech recognition, cut and paste, or the like) into the computer the language of the court judgment that requires Company XYZ to make a payment to John Q. Acme.

ii.B Application of Predicate Logic to the Court Judgment
  Original sentence: "The Court finds that John Q. Acme is entitled to recover from Company XYZ the sum of $1,000,000 as compensation for personal services provided by him to Company XYZ, of which $850,000 is payable within 10 days of the date of this order and of which $150,000 is payable when Company XYZ collects from its customers the $1,500,000 in fees for which John Q. Acme is entitled to be paid a 10% commission" and "Date of this order is Sep. 5, 2015"
  Paraphrase: The Court finds that John Q. Acme is entitled to recover from Company XYZ the sum of $1,000,000 as compensation for personal services provided by him to Company XYZ, and a portion of the $1,000,000 totaling $850,000 is payable John Q. Acme within 10 days of the date of this order, and a portion of the $1,000,000 totaling $150,000 is payable to John Q. Acme when Company XYZ collects from its customers the $1,500,000 in fees for which John Q. Acme is entitled to be paid a 10% commission, and the date of this order is Sep. 5, 2015.

The paraphrase can be performed using a variety of techniques as discussed elsewhere herein; for example: (a) by the computer using existing natural language software that has been modified to apply rules of syntax determined by courts to be applicable to the interpretation of the meaning of statutes, judicial, and regulatory authorities; (b) by one or more human subject matter experts—e.g., a person who has mastered the rules of predicate logic taught in a standard undergraduate introductory logic course at a four-year college or university, working as necessary with a tax attorney; or the like.

In one or more embodiments, the computer uses the rules of grammar and meanings of words contained in its database of dictionaries, grammatical rules, and rules of writing style published by reputable institutions and acknowledged as authoritative by U.S. courts in analyzing the meanings of words in U.S. tax statutes, regulations, and other documents included in its database as authoritative guidance on tax, legal, and accounting issues. In doing so the computer uses its database (for example) to identify words as adjectives, adverbs, nouns, etc.; determine which words in a sentence modify the meaning of other words; and determine how the words in the sentence, and the sentence as a whole, are to be interpreted.

The court judgment can be symbolized in PLE as follows:

$$[Facnp\&Pf(n,m)at(d(o))]\&[Pf(n,l)at\&d(o)=s]$$

The symbols are assigned the following interpretations:
UD: {agents, actions, dollar amounts, times}
Cxy: x collected from its customers the $1,500,000 in fees for which John Q. Acme is entitled to be paid a 10% commission [at time] y
Fxyzw: The Court finds that x is entitled to recover from y the sum of z as compensation for w
Hxy: x is more than 30 days prior to y
Pxyz: x is payable to y [at time] z
d(x): The date of x
t(x): within 10 days of x
$f(x,y)$: a portion of x totaling y
a: John Q. Acme
c: Company XYZ
l: $150,000
m: $850,000
n: $1,000,000
o: this order
p: personal services provided by John Q. Acme to Company XYZ
q: Nov. 15, 2015
r: Oct. 1, 2015
s: Sep. 5, 2015
t: when Company XYZ collects from its customers the $1,500,000 in fees for which John Q. Acme is entitled to be paid a 10% commission
u: today As will be appreciated by the skilled artisan, given the teachings herein, following orders like the foregoing relies on general background assumptions. For instance, one background assumption in this case is that if Company XYZ has collected from its customers the $1,500,000 in fees for which John Q. Acme is entitled to be paid a 10% commission more than 30 days prior to the current date, then $150,000 of the $1,000,000 is payable to him. This assumption can be represented in PLE as follows:

$$(\exists x)(Ccx\&Hxu) \supset Pf(n,l)au$$

In one or more embodiments, background assumptions such as these are proposed to the user of the computer system (e.g., the Tax Manager) so that the user can confirm or deny the accuracy of the assumptions. Consider how the foregoing assumption applies to a particular case. Suppose that Company XYZ collects the $1,500,000 in fees on Oct. 1, 2015, and that today's date is Nov. 15, 2015, which is more than 30 days after Oct. 1, 2015. These circumstances and the general background assumption can be represented in PLE as follows:

1. $(\exists x)(Ccx \& Hxd(u)) \supset Pf(n,l)au$ Assumption
2. Ccr Assumption
3. $d(u)=q$ Assumption
4. Hrd(u) Assumption From these claims, and the Tax Manager's confirmation that each of the assumptions is correct, the following conclusions can be derived using the rules of the derivation system PDE from The Logic Book, Sixth Edition.

5. Ccr & Hrd(u) 2,4 &I
6. $(\exists x)(Ccx \& Hxd(u))$ 5 $\exists$I
7. $Pf(n,l)au$ 1,6 $\supset$ E By applying the rules of PDE it is possible to derive the conclusion symbolized on line 7 that $150,000 of the $1,000,000 is payable to John Q. Acme at this time.

Note that this is a non-limiting example; PDE is not the only system that can be used for testing logical consistency, implication, and equivalence in the language PLE. For example, the authors of *The Logic Book* also provide rules for constructing truth trees, a different system for testing logical consistency, implication, and equivalence which is also sound. There are thus multiple ways in which a computer might be programmed to arrive validly at its conclusions.

ii.C: Missing Propositions

As noted above, occasionally the computer is given insufficient information by the Tax Manager to answer the question put to it. When this happens the computer makes assumptions as to the answers to the missing information and presents to the Tax Manager a series of questions in a window on the manager's computer screen to which the Tax Manager answers true or false. "Yes" answers are treated by the computer as confirmation that the assumptions made by the computer are correct; "false" answers are treated by the computer as meaning that the assumptions made by the computer are incorrect. By answering these questions the Tax Manager supplies the computer with the additional information it needs to derive an answer. Examples of some questions and related answers specific to the example described in FIG. 2 could be the following:

1. Company XYZ is carrying on a trade or business. (True or False) Tax Manager's answer: True
2. The $850,000 of compensation payable to John Q. Acme within 10 days of the order is reasonable (True or False) Tax Manager's answer: True
3. The $150,000 of compensation to John Q. Acme payable 30 days after Company XYZ collects from its customers the $1,500,000 in fees for which John Q. Acme is entitled to be paid a 10% commission is reasonable. (True or False) Tax Manager's answer: True
4. Is the $1,000,000 payable to John Q. Acme used as the basis for a deduction or a credit under provisions of law other than section 162? (True or False) Tax Manager's answer: False
5. The $1,000,000 payable to John Q. Acme is an ordinary expense or expenditure of Company XYZ? (True or False) Tax Manager's answer: True
6. The $1,000,000 payable to John Q. Acme is a necessary expense or expenditure of Company XYZ? (True or False) Tax Manager's answer: True.
7. The taxable year in which the services for which compensation of $850,000 is payable to John Q. Acme actually rendered is: Tax Manager's answer: 2013
8. Taxable year in which the services for which compensation of $150,000 is payable to John Q. Acme actually rendered is Tax Manager's answer: 2013
9. The taxable year in which the $850,000 payable to John Q. Acme was paid or incurred is: Tax Manager's answer: 2013
10. The taxable year was $150,000 payable to John Q. Acme was paid or incurred is: Tax Manager's answer: 2017
11. The $1 million payment is directly connected with or directly related to Company XYZ's trade or business. (True or False) Tax Manager's answer: True
12. The $1 million payment is for personal services actually rendered. (True or False) Tax Manager's answer: True Regarding item 9 just above, in answering this question the Tax Manager uses his or her knowledge of the meaning under federal tax law of the word "incurred" as meaning the year to which, under Company XYZ's method of calculating its taxable income, the $850,000 belonged (2013) and applies his judgment in determining that the correct answer to the computer's question is to answer the computer's question by stating the earlier of the years (i.e., 2013 instead of 2015) in which the $850,000 was paid or "incurred". Under other embodiments, however, the system could determine the meaning of the word "incurred" for this purpose by using its databases or other automated techniques.

ii.D: Resolution of Question Posed by Tax Manager

The computer system compares the information provided by the Tax Manager to the requirements contained in the tax law for payments to be deductible. Some of the information provided by the Tax Manager was provided in the language of the Judgment against company XYZ that the Tax Manager typed (or otherwise entered) into the computer, and some of the information was provided by the answers the Tax Manager gave to the questions posed by the computer when the computer identified certain missing pieces of information.

Because all of the requirements of the tax law as identified by the computer were met by the information provided by the Tax Manager, the computer concludes that the answer to the Tax Manager's question is "Yes".

Recapitulation

Figure 5:
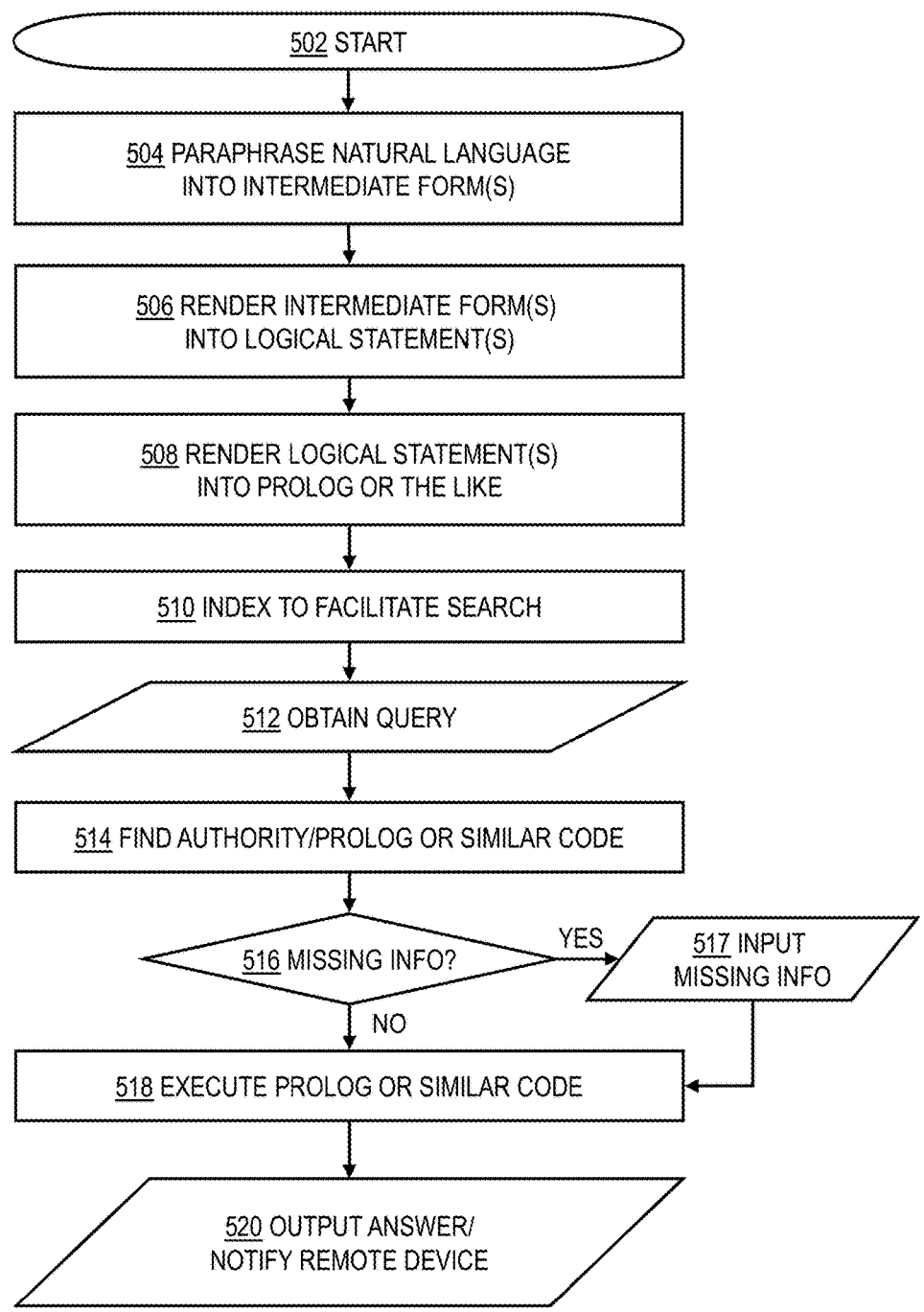
FIG. 5 is a flow chart of an exemplary method, in accordance with an aspect of the invention.

Given the discussion thus far, and referring to the block diagram of FIG. 3 and the flowchart of FIG. 5 (which begins at 502), it will be appreciated that, in general terms, an exemplary method, according to an aspect of invention, includes the step 504 of paraphrasing at least one pertinent authority, in ordinary English language, into a series of intermediate forms. The at least one pertinent authority includes at least one of a tax authority and an accounting authority (if an accounting entry to record the tax consequences of a transaction is to be generated by the system, at least one tax authority and one accounting authority should be identified as pertinent authorities). For example, the at least one pertinent authority could include the Federal Internal Revenue Code (a/k/a Federal tax Law), Federal Tax Regulations, state tax laws, state tax regulations, or generally accepted accounting principles. Non-limiting examples of intermediate forms are given above; refer, for example, to the above discussion wherein Code Section 162(a)(1)) is paraphrased into the intermediate form "If y is a trade or business and x is an ordinary or necessary expense paid or incurred during the taxable year in carrying out that trade or business, then x is a deduction. In addition, if z is a reasonable allowance for salaries or other compensation for personal services actually rendered in carrying on that business or trade, then z is an ordinary or necessary expense paid or incurred during the taxable year in carrying out that trade or business."

A further step 506 includes rendering the series of intermediate forms into a corresponding series of logical statements (e.g., predicate logic formulas, IF-THEN-ELSE constructs, or the like). Refer, for example, to the above example where the intermediate form just quoted is symbolized in PLE resulting in the following logical statement:

$$(\forall x)(\forall y)[[((Ty \lor By) \& (Oxy \lor Nxy)) \supset Dx] \& (\forall z)[Rzy \supset (Ozy \lor Nzy)]]$$

An even further step 508 includes encoding the series of logical statements into relations in a logic programming language (PROLOG is a non-limiting example of a logic programming language; the skilled artisan will appreciate that Logic programming is a programming paradigm based on formal logic, and that a program written in a logic programming language is a set of sentences in logical form, expressing facts and rules about some problem domain—major logic programming language families include Prolog, Answer Set Programming (ASP) and Datalog).

Of course, while the steps might be carried out for a single pertinent authority, in a typical case, there will be many different pertinent authorities, and the paraphrasing includes paraphrasing a plurality of pertinent authorities, in ordinary English language, into a plurality of series of indeterminate forms (the plurality of pertinent authorities each including at least one of a tax authority and an accounting authority; the rendering includes rendering the plurality of series of intermediate forms into a corresponding plurality of series of logical statements; and the encoding includes encoding the plurality of series of logical statements into a plurality of relations in a logic programming language. When there is more than one authority, a further step 510 can include indexing the plurality of pertinent authorities in a database (e.g., 305, 306, 307) to facilitate subsequent searching to locate at least one of the plurality of pertinent authorities applicable in a given situation. In a non-limiting example, the indexing includes rendering at least one of the authorities, the intermediate forms, and the logical statements into extensible markup language, and the database includes an extensible markup language database.

A variety of techniques can be used to carry out these steps. In one embodiment, a tax attorney documents the rules of language interpretation used by courts to determine the meaning of words and sentences including, but not limited to, words of statutes, regulations, contracts, and judgments (e.g., "necessary and sufficient" vs. "necessary but not sufficient"). The tax attorney also documents the rules followed by courts in determining the hierarchy of legal authorities, e.g. "U.S. Constitution first, Federal Statutes second, Federal Regulations third"; "the greater includes the lesser, e.g., 'taxes' means all types of taxes, whereas 'income taxes' excludes taxes that are not income taxes because the adjective 'income' modifies, and thus limits, the scope of the word 'taxes' when the word 'income' immediately precedes the noun 'taxes'."

The tax attorney provides the rules documented above to a person trained in predicate logic (the "logician"). The logician prepares examples of how natural language sentences should be paraphrased into, for example, an "if-then" format (that follows the rules of statutory interpretation applied by the courts) to which predicate logic can be applied.

The logician meets with a tax attorney and together they review the logician's work. They discusses what they each believe the "if-then" language means when compared to the original, "natural", language in the internal revenue code as that natural language would be interpreted by a court. Note that all sections of the internal revenue code and its interpretative authorities (e.g., regulations, rulings, case law) need not necessarily be analyzed by the tax attorney and logician; rather, the tax attorney and logician analyze a sufficient number of cases to determine the rules used by courts to analyze the meanings of sentences and how the meaning of sentences should be construed. Together they make any changes required to the "if-then format" language so that the logician and the tax attorney agree on its meaning and agree that the "if-then" language accurately represents the meaning of the words in the selection of samples of natural language contained in the tax law and accounting pronouncements (statutes, regulations, judicial decisions, etc.) on which the logician's work is based.

The logician and tax attorney send to a computer programmer the logical symbols and rules explaining how courts interpret sentences written in natural language. The computer programmer can then take some or all of the following actions.

(a) developing a database management system (DBMS) 304 to conduct key word searches of the tax and GAAP accounting authorities 305, 306, 307 contained in its database(s) using the words input into the system by the user of the system (e.g. by the Tax Manager)—this can be done by adapting an existing DBMS or developing a new DBMS—in a non-limiting example, the DBMS allows querying extensible markup language (XML) representations of the intermediate forms stored in the database based on the at least one of user-entered query terms and query terms derived from pertinent prose;

(b) developing a natural language processing (NLP)/natural language understanding (NLU)/natural language programming system that "paraphrases" the natural language (e.g. English) of the law and accounting rules into the intermediate forms (e.g., predicate logic formulas, IF-THEN-ELSE constructs, or the like)—this can be done by adapting an existing system or developing a new system—the PYTHON language is an example of a language that can be used for text processing;

(c) developing a natural language processing (NLP)/natural language understanding (NLU)/natural language programming system that renders the intermediate forms (e.g., predicate logic formulas, IF-THEN-ELSE constructs, or the like) into relations in the logic programming language (PROLOG or the like)—this can be done by adapting an existing system or developing a new system—the PYTHON language is an example of a language that can be used for text processing to create the PROLOG statements.

Note that as part of the paraphrasing, the developed system deals with the inconsistent placement of punctuation inside quotation marks in American English.

Note that every step need not necessarily be automated; for example, the paraphrasing could be carried out manually in some cases, while in other cases, the paraphrasing includes text processing with a computer in accordance with rules obtained at least in part from a training process.

In some cases, the rendering and encoding steps include processing the logical statements with a PYTHON program to obtain the relations in the logic programming language, the logic programming language comprising PROLOG.

In some cases, the rules include removal of inappropriate punctuation marks within quotations in the ordinary English language, to facilitate computer processing.

In some cases, the process of training the computer (the "training process") encodes into the rules natural language interpretation semantics from judicial decisions interpreting the authorities.

In FIG. 3, regarding paraphrasing ((b) above), refer to NLP/NLU paraphrasing 310. In one or more embodiments, the logician and tax attorney develop a training corpus 311 by manually paraphrasing a representative set of authorities, in ordinary English language, into a corresponding series of intermediate forms, with annotations to permit machine learning module 312 to learn how to paraphrase automatically. The system 310 has a lexicon 313 of the language and a parser and grammar rules 314 to break sentences into an internal representation. The system also has a semantic theory embodied at 315 to guide the comprehension of the computer system.

In FIG. 3, regarding rendering the forms into logic programming ((c) above), refer to NLP/NLU intermediate form-logic 317. In one or more embodiments, the logician and tax attorney develop a training corpus 318 by manually rendering a representative set of intermediate forms into a corresponding series of logical statements, with annotations to permit machine learning module 319 to learn how to render automatically. The system 317 has a lexicon 320 of the language (intermediate form language) and a parser and grammar rules 321 to break sentences of the intermediate forms into an internal representation. The system also has a semantic theory embodied at 322 to guide the comprehension.

System 317 produces logical statements in the form of, e.g., PROLOG code 324 or the like, which can be executed (queried) by engine 308. The databases can include the original text, paraphrases and logical forms (e.g. in XML) and the PROLOG code for each section or subsection.

In some instances, a further step 512 includes obtaining at least one of user-entered query terms and query terms derived from pertinent prose. At least one of the user-entered query terms and query terms derived from pertinent prose specifies at least one of a tax problem and an accounting problem. Many techniques, well-known in and of themselves, can be used to obtain the query terms as input 301; e.g., user interface 302 may include a drop-down menu; terms may be typed in (optionally with wildcards), keywords may be extracted from a natural language query and/or from plain text prose like a court judgment, using keyword extractor 303, or the like. Examples of wildcard queries include "deduct\*" and "compensat\*" while an example of a query without wildcards includes "Federal".

A further step 514 includes, based on the at least one of user-entered query terms and query terms derived from pertinent prose, searching the database 305, 306, 307, to locate the at least one of the plurality of pertinent authorities applicable in the given situation.

An even further step 518 includes applying those of the plurality of relations in the logic programming language corresponding to the at least one of the plurality of pertinent authorities applicable in the given situation to a problem ascertainable from the at least one of user-entered query terms and query terms derived from pertinent prose, to obtain a conclusion (e.g., answer to a tax law question, accounting entries corresponding to a transaction, and the like), which is presented to a decision maker at 520 (e.g., user interface 302 provides output 309). Refer also to the possible notification via remote device(s) 395.

Referring to decision block 516, in some instances, a further step includes determining that application of those of the plurality of relations in the logic programming language corresponding to the at least one of the plurality of pertinent authorities applicable in the given situation to the problem ascertainable from the at least one of user-entered query terms and query terms derived from pertinent prose requires additional information (YES branch) and querying the user to provide the additional information, at 517. This situation could arise when the computer has selected the pertinent tax law and/or accounting authorities based on the information supplied by the user but, in applying predicate logic to those authorities, the computer identifies missing facts. In such cases the computer makes assumptions as to the answers to the missing information and presents to the user a series of questions in a window on the Tax Manager's computer screen to which the Tax Manager answers "true" or "false". "True" answers are treated by the computer as confirmation that the assumptions made by the computer are correct; "false" answers are treated by the computer as meaning that the assumptions made by the computer are incorrect. By answering these questions the Tax Manager supplies the computer with the additional information it requires to derive an answer. The conclusion provided by the computer is therefore based on the additional information obtained in this manner from the user of the invention. When there is no missing information (NO branch), proceed directly to step 518.

Consider again step 512. For an example of obtaining user-entered query terms, see, e.g., step 202B, deduction and compensation and specification of Federal taxes. For an example of query terms derived from pertinent prose, see, e.g., step 204B, language of judgment. As noted, the at least one of (1) the user-entered query terms and (2) the query terms derived from pertinent prose specify at least one of a tax problem and an accounting problem. Here, the user-entered query term (selecting federal tax from drop-down menu) specifies a federal tax problem. Of course, there can be additional granularity; tax problems can be federal, state, or local, and will vary among the 50 states. This step can be carried out by using UI 302 to obtain input 301.

As noted, the pertinent prose can optionally be processed with keyword extractor 303 to obtain keywords by simply ignoring stop words or with additional processing using more sophisticated NLU and or NLP.

Based on the user-entered query terms and/or query terms derived from pertinent prose, at least one of the databases 305, 306, 307 corresponding respectively to the at least one of a tax problem and an accounting problem (here, 305) is searched using DBMS 304 to identify at least one pertinent authority. As noted, this can be a simple or more sophisticated search. Some embodiments search based on ranking by number of hits. Some embodiments also search for synonyms and/or discard suffixes and search for roots. Note that the dotted line around elements 305, 306, 307 indicates that there may be separate databases or multiple parts of a single database. In some cases, the searching includes querying extensible markup language representations of the intermediate forms stored in the database based on the at least one of user-entered query terms and query terms derived from pertinent prose. Other approaches could be used in other cases; e.g., keyword index, word count, and so on. The search could be against the text, the paraphrase, the logical forms, an XML representation of same, or the like. For example, as discussed in Legal Information Retrieval and Application to E-Rulemaking by Gloria T. Lau et al., ICAIL '05, Jun. 6-11, 2005, Bologna, Italy, expressly incorporated herein by reference in its entirety for all purposes, in some cases, user queries can be treated as a pseudodocument containing very few keywords from user input. As a result, determining the similarity between documents and user query (which can be modeled as a short document) can be modeled as document comparisons. Different techniques are developed to compute the match between user queries and documents, such as the Boolean model and the Vector model (see Salton, G. *The Smart Retrieval System-Experiments in Automatic Document Processing*, Prentice Hall, Englewood Cliffs, N J, 1971, and Salton, G., and McGill, M. *Introduction to Modern Information Retrieval*, McGraw-Hill, New York, N.Y., 1983, both expressly incorporated herein by reference in their entireties for all purposes. Some techniques employ bag-of-word analyses on the index terms, as per Baeza-Yates, R., and Ribeiro-Neto, B., *Modern Information Retrieval*, ACM Press, New York, N.Y., 1999, expressly incorporated herein by reference in its entirety for all purposes. There are a variety of algorithms to compute index term weights, and a general review can be found in Salton, G., and Buckley, C. Term-Weighting Approaches in Automatic Retrieval, *Information Processing and Management*, 24, 5 (1988), 513-523, expressly incorporated herein by reference in its entirety for all purposes. One non-limiting exemplary simple approach uses the count of term appearance as the term weight.

Engine 308 applies the at least one pertinent authority to a problem ascertainable from the at least one of user-entered query terms and query terms derived from pertinent prose, to obtain a conclusion. See step 212B. This can be done based on simple counts (for example, pertinent internal revenue code section is stored in 305 together with conclusion "deductible" and if input has enough words matching that code section, conclude answer to input question is "deductible"). More sophisticated NLU and or NLP techniques or techniques using Boolean Algebra or symbolic logic or the like can be employed in other embodiments. The conclusion is presented to a decision maker as output 309 using UI 302. See steps 214B-218B, e.g.

In some instances, the logic programming language comprises PROLOG and the applying step includes querying those of the plurality of relations in PROLOG corresponding to the at least one of the plurality of pertinent authorities applicable in the given situation with a query pertinent to the problem ascertainable from the at least one of user-entered query terms and query terms derived from pertinent prose, to obtain the conclusion. The skilled artisan will appreciate that in Prolog, program logic is expressed in terms of relations, and a computation is initiated by running a query over these relations; this query is not to be confused with the initial user query.

Where the database is divided into at least a tax portion and an accounting standards portion, the searching can be limited based on at least one of the query terms. For example, a question of Federal tax law would query database 305 only.

In some cases, more than one authority is pertinent e.g. internal revenue code and corresponding IRS regulation. Thus, in some cases, said step of searching said database to locate said at least one of said plurality of pertinent authorities applicable in said given situation, at least two of said plurality of pertinent authorities are applicable in said given situation. IN such cases, further steps can include determining whether a conflict exists between said at least two of said plurality of pertinent authorities are applicable in said given situation; and resolving said conflict in accordance with predetermined rules. Furthermore in this regard, when more than one authority is identified by the computer system as pertinent, the system is programmed to select all authorities that contained the key words used by the computer to identify pertinent authorities. The system then employs rules of legal precedence and analysis to determine which authorities are to be followed in the event of a conflict between them. In the U.S. legal system certain laws take precedence over others in the event of a conflict between them. An example is the U.S. Constitution, which takes precedence over a federal or state statute or a state's constitution. When laws of equal "rank" conflict, such as when two federal statutes conflict with each other, U.S. law provides that the "latest expression of legislative will controls", that is, the more recently enacted statute represents the controlling law and the older statute is treated as inapplicable to the extent it conflicts with the newer statute. When regulations are published by federal, state, or local tax authorities (such as the I.R.S.) interpreting or supplementing tax statutes, U.S. tax law generally gives deference to regulations issued by those tax agencies except in cases in which the language of a regulation clearly contradicts (a) the plain language of the portion of the statute to which the regulation relates or (b) the intent of the legislature (Congress or the state legislature) concerning how the language of the statute should be interpreted (the intent of the legislature typically being evidenced by the language explaining the legislature's intent contained in the legislature's records). The computer is programmed to apply these rules of determining which statute or source of authority is to be followed in the event of a conflict, and thus, for example, it treats the requirements contained in a tax regulation as taking precedence over the words in a section of the tax code except in cases of code sections that have been specifically identified in its database as taking precedence over the tax regulations associated with those code sections. Because one or more embodiments also provide the user with a written explanation of the reason for the conclusion, the user is able to understand how the system reached its conclusion and, if the user decides the system did not consider the correct authorities, the user can re-submit his question to the system with additional explanations to assist the system in identifying the most relevant legal authorities.

Some embodiments are implemented as an apparatus comprising a memory; at least one processor operatively coupled to the memory; and a persistent storage device operatively coupled to the memory and storing in a non-transitory manner instructions which when loaded into the memory cause the at least one processor to be operative to carry out any one, some, or all of the method steps described. The instructions can be in the form of distinct software modules as described elsewhere herein.

Some embodiments are implemented at least in part as an article of manufacture comprising a computer program product. The computer program product includes a tangible computer-readable recordable storage medium, storing in a non-transitory manner computer readable program code, the computer readable program code comprising computer readable program code configured to cause a processor to carry out any one, some, or all of the method steps described.

Current computer programs that interpret natural language have difficulty in interpreting the exact meanings of entire sentences because of different views among computer scientists about the proper semantics to use in analyzing those sentences and how different users of American English use semantics. One or more embodiments use a computer system that is programmed to interpret natural language using semantics 315, 322 applicable to U.S. statutes and other judicial and regulatory authorities, which can be determined based on a review of judicial decisions. A review of every judicial decision is not required to define this semantics; what is done, however, in one or more embodiments, is a review and analysis of how courts have interpreted the sentence structures (semantics) of tax statues and regulations so that a "legal interpretative semantics" can be developed that the computer will be programmed to use in its analysis of natural language.

Note that computers view punctuation differently than do humans, and as a result a computer that analyzes natural language should be programmed to be able to recognize that difference and re-write the natural language into a form that can be understood. The skilled artisan will appreciate that this is a computer-specific problem.

A challenge presented by the use of a computer to reach a conclusion through the application of propositional logic that is not presented when a human being applies propositional logic arises from the fact that punctuation used in standard American English is often inconsistent with the overall meaning of an American English sentence. For example, in American English, punctuation marks are placed inside the quotation marks, whereas in "British" English the punctuation marks are only placed inside the quotation marks when the punctuation mark is part of the quotation. The following explanation comes from the "Frequently Asked Questions" file of alt_dot_english_dot_usage ("." replaced with "_dot_ to avoid inclusion of browser-executable code in the text of the patent application:

"In the days when printing used raised bits of metal, "."
and "," were the most delicate, and were in danger of damage (the face of the piece of type might break off from the body, or be bent or dented from above) if they had a " " on one side and a blank space on the other. Hence the convention arose of always using '."' and ',"' rather than "'.' and "',', regardless of logic."

Placing punctuation inside quotation marks often changes the meaning of the quotation which can, when used by a computer, result in an incorrect result being achieved. The challenge this poses in translating standard American English into a form acceptable for use by a computer is noted by the Chicago Manual of Style (16$^{th}$ edition), which otherwise endorses the American way, makes an exception in the case of computer instruction, illustrated by the following instruction:

name your file "appendix A, v. 10".

The prevailing style in the United Kingdom and other non-American locales-called British style and logical quotation—is to include within quotation marks only those punctuation marks that appeared in the original quoted material, but otherwise to place punctuation outside the closing quotation marks Logical punctuation. See Ben Yagoda (12 May 2011), "The Rise of "Logical Punctuation"", *Slate*, Retrieved 2011 May 2013.

One or more embodiments are geared to calculating both the best tax answer to a particular question and to producing the accounting journal entry to record that tax result which journal entry must be completed and recorded in a company's financial statements. For all public companies and almost all private companies the financial results of the companies must be determined every quarter. Furthermore, the tax journal entry is always the last entry to be completed before the company's numbers for the quarter or for the year are deemed to be complete (the tax entry being dependent on the "pre-tax" results of the company's operations for that quarter), and frequently the tax journal entries are late because the accounting journal entries for the quarter on which those tax entries must be calculated are late. As a result, when the quarterly results of a company's operations are being tabulated, the company's Vice President of Tax, its Controller, its CFO, and its CEO are often awaiting the completion of the tax journal entry and the overall financial statements, and frequently call members of the tax department to find out if the tax entry has been booked. Once the tax entry has been posted the Tax VP typically calls the CFO and tells him what the tax entry is and what the amount of the company's tax expense is for the quarter so that the CFO is able to give the CEO an update on what the net, after-tax earnings of the company for the quarter are. One or more embodiments allow relevant parties (e.g., the VP of Tax) to be notified as soon as the tax journal entries for the quarter are ready.

Referring again to FIG. 3, some embodiments provide a feature that allows the notification all users of the system (e.g., the Tax Manager, the Tax VP, etc.) when the computer has calculated the tax entry so that the users of the system, rather than sitting at their desks or at their computers late at night or on the weekends, can have their computers be off-line and receive a text (or similar) notification when the system has completed the tax calculations and prepared the tax journal entry.

For example, once comparison and inference engine 308 has the required result, it communicates with one or more remote devices 395-1, 395-2, 395-*n* (collectively, 395) over network 397 (e.g., Internet connection, 3G or 4G wireless network, Wi-Fi network, or the like). The devices could be tablets, smart phones, etc. In some embodiments, a transmission server (400 is generally representative) with a microprocessor 420 and a memory 430 transmits an alert over a data channel (e.g., 397) to a wireless device (e.g., 395), and an application is provide for device(s) 395 that cause the alert to display, e.g., on a computer of a pertinent party and enables a connection from the computer of a pertinent party to a data source (e.g., engine 308) over the Internet when the computer of a pertinent party comes online.

One or more embodiments make the use of a company's computers more efficient by requiring less computing power and storage capacity that would be required if the calculations needed for the analysis and journal entries were all stored on the company's internal servers or on the computers of members of the tax department. Notebook computers typically do not have the storage capacity nor the processing power to do all this work on their own, and putting this system on the company's servers would require many more machines than are currently used by most companies.

One or more embodiments improve the efficiency of a network of computers by having the heavy-duty processing occur at a central location instead of having each user's notebook or tablet computer attempt to do it. Some embodiments are limited to the use of symbolic logic by the computer.

In some cases, appropriate output (e.g., accounting entries such as debits and credits) are made available to a general ledger system 399 (e.g., via an application programming interface (API) or the like).

System and Article of Manufacture Details

Embodiments of the invention can employ hardware and/or hardware and software aspects. Software includes but is not limited to firmware, resident software, microcode, etc.

Figure 4:
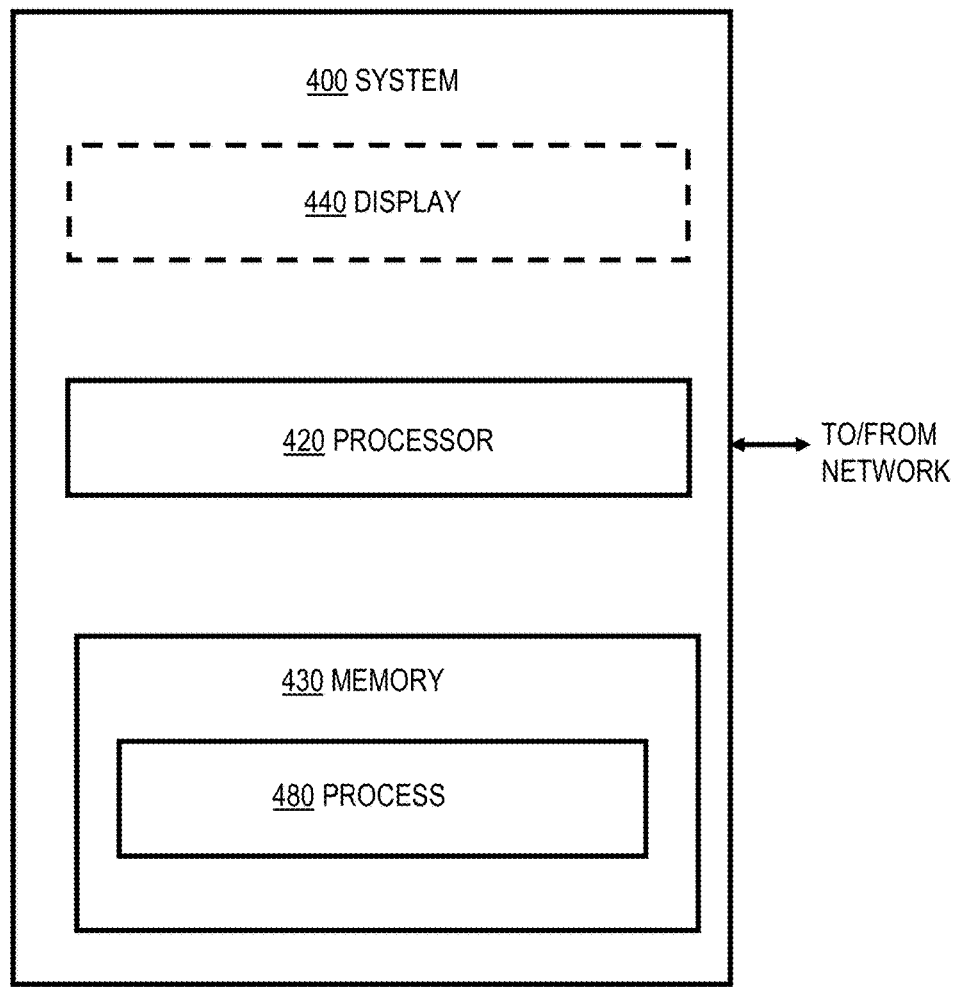
FIG. 4 is a block diagram of an exemplary computer system useful in one or more embodiments of the invention.

FIG. 4 is a block diagram of a system 400 that can implement part or all of one or more aspects or processes of the invention. As shown in FIG. 4, memory 430 configures the processor 420 to implement one or more aspects of the methods, steps, and functions disclosed herein (collectively, shown as process 480 in FIG. 4). Different method steps can be performed by different processors. The memory 430 could be distributed or local and the processor 420 could be distributed or singular. The memory 430 could be implemented as an electrical, magnetic or optical memory, or any combination of these or other types of storage devices. It should be noted that if distributed processors are employed, each distributed processor that makes up processor 420 generally contains its own addressable memory space. It should also be noted that some or all of computer system 400 can be incorporated into an application-specific or general-use integrated circuit. For example, one or more method steps could be implemented in hardware in an ASIC rather than using firmware. Field programmable gate arrays (FPGAs) could also be used in some instances. Display 440 is representative of a variety of possible input/output devices (e.g., displays, printers, keyboards, mice, touch pads, and so on).

In addition to being representative of a server or other general-purpose computer, FIG. 4 is also generally representative of processing capability of a "smart" cellular telephone or the like, which would also include, e.g., 3G or 4G wireless circuitry and an antenna in a well-known manner.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is defined to encompass a recordable medium (non-transitory storage), examples of which are set forth above, but does not encompass a transmission medium or disembodied signal.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 400 as shown in FIG. 4) running a server program. It will be understood that such a physical server may or may not include a display, keyboard, or other input/output components. A "host" includes a physical data processing system (for example, system 400 as shown in FIG. 4) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. Referring to FIG. 3, in one or more embodiments, the modules include a user interface module 302, a keyword extractor module 303, a DBMS module 304, and a comparison and inference engine module 308. As discussed above, the database module 304 can include, for example, a graph database or a relational database management system (RDBMS) which provides access to databases 305, 306, 307 via queries and the like. The engine functionality is discussed above. The user interface module can include, in some cases, an API and/or a graphical user interface (GUI), such as that formed by a server serving out hypertext markup language (HTML) code to a browser of a user. The user interface can also provide windows, menus, dialog boxes, or the like, for entry and/or selection of keywords and the like in a well-known manner. Modules can also be provided to implement block 310 and its sub-blocks and block 317 and its sub-blocks, as well as the general ledger system 399. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Thus, aspects of the invention can be implemented, for example, by one or more appropriately programmed general purpose computers, such as, for example, servers or personal computers. Such computers can be interconnected, for example, by one or more of the Internet, a local area and/or wide area network (LAN and/or WAN), and so on. The computers can be programmed, for example, in compiled, interpreted, object-oriented, assembly, and/or machine languages, for example, one or more of C, C++, Java, Visual Basic, COBOL, Assembler, Structured Query Language (SQL), PYTHON, PROLOG, and the like (an exemplary and non-limiting list), and can also make use of, for example, Extensible Markup Language (XML), known application programs such as database programs (e.g., IBM DB2® software available from International Business Machines Corporation, Armonk, N.Y., US; SAS® software available from SAS Institute, Inc., Cary, N.C., US; graph database programs), spreadsheets (e.g., MICROSOFT EXCEL® software available from Microsoft Corporation, Redmond, Wash., US), and the like. The computers can be programmed to implement the logic and/or data flow depicted in the figures.

Although illustrative embodiments of the invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
paraphrasing a plurality of pertinent authority documents, stored in ordinary English language as electronic documents in an electronic database, into a plurality of series of intermediate forms, by text processing with a trained paraphrasing machine learning module, executing on at least one hardware processor, in accordance with rules obtained at least in part from a paraphrasing training process, said paraphrasing training process encoding into said rules natural language interpretation semantics from judicial decisions interpreting said authority documents, said plurality of pertinent authority documents each comprising at least one of a tax authority and/or an accounting authority;
rendering said plurality of series of intermediate forms into a corresponding plurality of series of logical statements in predicate logic extended (PLE), using a trained intermediate form-logic machine learning module, executing on said at least one hardware processor, in accordance with rules obtained at least in part from an intermediate form-logic training process;
encoding said plurality of series of logical statements in predicate logic extended (PLE) into a plurality of relations in a logic programming language by processing said logical statements with a PYTHON program executing on said at least one hardware processor to obtain said relations in said logic programming language, said logic programming language embodying a programming paradigm based on formal logic, said relations in said logic programming language comprising a set of sentences in logical form, expressing facts and rules about a corresponding pertinent problem domain;
indexing said plurality of pertinent authority documents in said electronic database to facilitate subsequent searching to locate at least one of said plurality of pertinent authority documents applicable in a given situation;
obtaining, via a user interface, at least one of user-entered query terms and query terms derived from pertinent prose, at least one of said user-entered query terms and query terms derived from pertinent prose specifying at least one of a tax problem and an accounting problem;
based on said at least one of user-entered query terms and query terms derived from pertinent prose, searching said electronic database to locate said at least one of said plurality of pertinent authority documents applicable in said given situation;
responsive to said searching and locating, activating a comparison and inference engine executing on said at least one hardware processor, to apply those of said plurality of relations in said logic programming language corresponding to said at least one of said plurality of pertinent authority documents applicable in said given situation to a problem ascertainable from said at least one of user-entered query terms and query terms derived from pertinent prose, to obtain a conclusion by applying predicate derivation extended (PDE); and
presenting said conclusion to a decision maker, via said user interface.

2. The method of claim 1, wherein said indexing comprises rendering at least one of said authority documents, said intermediate forms, and said logical statements into extensible markup language, and wherein said database comprises an extensible markup language database.

3. The method of claim 1, wherein said rules obtained at least in part from said paraphrasing training process include removal of inappropriate punctuation marks within quotations in said ordinary English language, to facilitate computer processing.

4. The method of claim 1, wherein said plurality of pertinent authority documents comprise federal tax laws, federal tax regulations, state tax laws, state tax regulations, and generally accepted accounting principles.

5. The method of claim 1, further comprising:
determining that application of those of said plurality of relations in said logic programming language corresponding to said at least one of said plurality of pertinent authority documents applicable in said given situation to said problem ascertainable from said at least one of user-entered query terms and query terms derived from pertinent prose requires additional information; and
querying said user to provide said additional information; wherein said conclusion is further obtained based on said additional information.

6. The method of claim 1, wherein said database is divided into at least a tax portion and an accounting standards portion, further comprising limiting said searching based on at least one of said query terms.

7. The method of claim 1, wherein said searching comprises querying extensible markup language representations of said intermediate forms stored in said database based on said at least one of user-entered query terms and query terms derived from pertinent prose.

8. The method of claim 1, wherein said logic programming language comprises PROLOG and wherein said applying comprises querying those of said plurality of relations in PROLOG corresponding to said at least one of said plurality of pertinent authority documents applicable in said given situation with a query pertinent to said problem ascertainable from said at least one of user-entered query terms and query terms derived from pertinent prose, to obtain said conclusion.

9. The method of claim 1, wherein in said step of searching said database to locate said at least one of said plurality of pertinent authority documents applicable in said given situation, at least two of said plurality of pertinent authority documents are applicable in said given situation, further comprising:
  determining whether a conflict exists between said at least two of said plurality of pertinent authority documents are applicable in said given situation; and
  resolving said conflict in accordance with predetermined rules.

10. The method of claim 1, wherein presenting said conclusion further comprises sending a notification to remote devices of members of a corporate tax team over a network to activate applications on said remote devices to cause alerts to display on computers of said members of said corporate tax team when said computers come online, to facilitate connection of said computers to said comparison and inference engine.

11. A non-transitory computer readable medium comprising computer executable instructions which when executed by a computer cause the computer to perform the method of:
  paraphrasing a plurality of pertinent authority documents, stored in ordinary English language in an electronic database, into a plurality of series of intermediate forms, by text processing with a trained paraphrasing machine learning module, executing on at least one hardware processor, in accordance with rules obtained at least in part from a paraphrasing training process, said paraphrasing training process encoding into said rules natural language interpretation semantics from judicial decisions interpreting said authority documents, said plurality of pertinent authority documents each comprising at least one of a tax authority and an accounting authority;
  rendering said plurality of series of intermediate forms into a corresponding plurality of series of logical statements in predicate logic extended (PLE), using a trained intermediate form-logic machine learning module, executing on said at least one hardware processor, in accordance with rules obtained at least in part from an intermediate form-logic training process;
  encoding said plurality of series of logical statements in predicate logic extended (PLE) into a plurality of relations in a logic programming language by processing said logical statements with a PYTHON program executing on said at least one hardware processor to obtain said relations in said logic programming language, said logic programming language embodying a programming paradigm based on formal logic, said relations in said logic programming language comprising a set of sentences in logical form, expressing facts and rules about a corresponding pertinent problem domain;
  indexing said plurality of pertinent authority documents in said electronic database to facilitate subsequent searching to locate at least one of said plurality of pertinent authority documents applicable in a given situation;
  obtaining, via a user interface, at least one of user-entered query terms and query terms derived from pertinent prose, at least one of said user-entered query terms and query terms derived from pertinent prose specifying at least one of a tax problem and an accounting problem;
  based on said at least one of user-entered query terms and query terms derived from pertinent prose, searching said electronic database to locate said at least one of said plurality of pertinent authority documents applicable in said given situation;
  responsive to said searching and locating, activating a comparison and inference engine executing on said at least one hardware processor, to apply those of said plurality of relations in said logic programming language corresponding to said at least one of said plurality of pertinent authority documents applicable in said given situation to a problem ascertainable from said at least one of user-entered query terms and query terms derived from pertinent prose, to obtain a conclusion by applying predicate derivation extended (PDE); and
  presenting said conclusion to a decision maker, via said user interface.

12. An apparatus comprising:
  a memory;
  at least one processor, coupled to said memory; and
  a non-transitory computer readable medium comprising computer executable instructions, said computer executable instructions including a trained paraphrasing machine learning module, a trained intermediate form-logic machine learning module, a PYTHON program, and a comparison and inference engine, said computer executable instructions, when loaded into said memory, configuring said at least one processor to be operative to:
    paraphrase a plurality of pertinent authority documents, stored in ordinary English language in an electronic database, into a plurality of series of intermediate forms, by text processing with said trained paraphrasing machine learning module, executing on said at least one processor, in accordance with rules obtained at least in part from a paraphrasing training process, said paraphrasing training process encoding into said rules natural language interpretation semantics from judicial decisions interpreting said authority documents, said plurality of pertinent authority documents each comprising at least one of a tax authority and an accounting authority;
    render said plurality of series of intermediate forms into a corresponding plurality of series of logical statements in predicate logic extended (PLE), using a trained intermediate form-logic machine learning module, executing on said at least one hardware processor, in accordance with rules obtained at least in part from an intermediate form-logic training process;
    encode said plurality of series of logical statements in predicate logic extended (PLE) into a plurality of relations in a logic programming language by processing said logical statements with said PYTHON program executing on said at least one processor to obtain said relations in said logic programming language, said logic programming language embodying a programming paradigm based on formal logic, said relations in said logic programming language comprising a set of sentences in logical form, expressing facts and rules about a corresponding pertinent problem domain;
    index said plurality of pertinent authority documents in said electronic database to facilitate subsequent searching to locate at least one of said plurality of pertinent authority documents applicable in a given situation;
    obtain, via a user interface, at least one of user-entered query terms and query terms derived from pertinent prose, at least one of said user-entered query terms and query terms derived from pertinent prose specifying at least one of a tax problem and an accounting problem;

based on said at least one of user-entered query terms and query terms derived from pertinent prose, search said electronic database to locate said at least one of said plurality of pertinent authority documents applicable in said given situation;

responsive to said searching and locating, activating said comparison and inference engine executing on said at least one hardware processor, to apply those of said plurality of relations in said logic programming language corresponding to said at least one of said plurality of pertinent authority documents applicable in said given situation to a problem ascertainable from said at least one of user-entered query terms and query terms derived from pertinent prose, to obtain a conclusion by applying predicate derivation extended (PDE); and present said conclusion to a decision maker, via said user interface.

\* \* \* \* \*